(12) United States Patent
Zheng

(10) Patent No.: US 7,971,377 B2
(45) Date of Patent: Jul. 5, 2011

(54) LENTICULAR IMAGE DISPLAY

(76) Inventor: Qun Zheng, Pierrefonds (CA)

(*) Notice: Subject to any disclaimer, the term of this patent is extended or adjusted under 35 U.S.C. 154(b) by 58 days.

(21) Appl. No.: 12/517,947

(22) PCT Filed: Dec. 7, 2007

(86) PCT No.: PCT/CA2007/002200
§ 371 (c)(1),
(2), (4) Date: Jun. 5, 2009

(87) PCT Pub. No.: WO2008/067669
PCT Pub. Date: Jun. 12, 2008

(65) Prior Publication Data
US 2010/0186271 A1 Jul. 29, 2010

Related U.S. Application Data

(60) Provisional application No. 60/868,987, filed on Dec. 7, 2006.

(51) Int. Cl.
*G03B 25/02* (2006.01)

(52) U.S. Cl. ........... 40/454; 40/471; 40/453; 40/437; 40/466

(58) Field of Classification Search .......... 40/453, 40/454; 353/30, 32; 352/116–118; 359/454–456, 359/619
See application file for complete search history.

(56) References Cited

U.S. PATENT DOCUMENTS

| | | | | |
|---|---|---|---|---|
| 2,154,959 A * | 4/1939 | Roose | | 40/626 |
| 3,871,033 A * | 3/1975 | Bartlett | | 4/499 |
| 3,996,682 A * | 12/1976 | Schwartz | | 40/794 |
| 4,059,095 A * | 11/1977 | Grundmann et al. | | 126/624 |
| 6,226,906 B1 * | 5/2001 | Bar-Yona | | 40/454 |
| 6,384,980 B1 | 5/2002 | McKinley | | |
| 6,612,054 B2 * | 9/2003 | Yang | | 40/436 |
| 7,210,257 B2 * | 5/2007 | McKinley | | 40/453 |
| 7,263,791 B2 | 9/2007 | Dana et al. | | |
| 2003/0223120 A1 | 12/2003 | Li et al. | | |
| 2004/0074121 A1 | 4/2004 | Bar-Yona | | |
| 2006/0082877 A1 | 4/2006 | Wang | | |
| 2009/0255157 A1 * | 10/2009 | Kim | | 40/546 |

OTHER PUBLICATIONS

International Search Report of PCT Application No. PCT/CA2007/002200 filed Dec. 7, 2007.

* cited by examiner

*Primary Examiner* — Joanne Silbermann
*Assistant Examiner* — Shin Kim

(57) ABSTRACT

A lenticular image display is provided for showing two or more changing images and/or three-dimensional (3D) motion effects, including a lenticular panel having an array of linear lenses, at least one image carrier bearing interlaced images disposed behind the lenticular panel in close contact with it, means for angularly aligning the lenses of the lenticular panel and the interlaced images of the image carrier, drive means for producing movement of the image carrier relative to the lenticular panel, a support disposed behind the image carrier, and partially compressed rings or other arcuate elastic elements disposed between the image carrier and the support, urging the image carrier in close contact with the lenticular panel, the arcuate elastic elements also being able to roll against the image carrier so as to facilitate the movement of the image carrier.

12 Claims, 23 Drawing Sheets

LENTICULAR IMAGE DISPLAY

TECHNICAL FIELD

The present invention relates to dynamic lenticular image displays for consecutively showing two or more changing images and/or three-dimensional (3D) motion effects.

BACKGROUND

Lenticular image displays are used to show two or more consecutively changing images (for example, to create an animation effect), or to show a 3D effect, often for commercial advertising. Such displays comprise a lenticular panel and interlaced images. A lenticular panel is a transparent plastic panel having a flat face and an obverse face comprising a plurality of linear lenses. The interlaced images are directly printed on the flat face of the lenticular panel or printed on a separate image sheet that fixedly laminates to, or moveably contacts against, the flat face of the lenticular panel.

In the case of showing an animation effect, the lenticular panel focuses the observer's view on only one of the two or more interlaced images at a time. The image that can be seen by an observer changes as a result of relative movement between the lenticular panel and the interlaced images, or as a result of movement by the observer relative to the display. In the case of showing a 3D effect, the lens of the lenticular panel must run vertically so that different images can be delivered to an observer's left and right eyes to create a 3D effect; a 3D motion effect will be produced when there is a relative movement between the lenticular panel and the interlaced images.

In a dynamic lenticular image display, relative movement between the lenticular panel and the interlaced images is necessary so that the viewer does not have to move to perceive an animation effect or a 3D motion effect. In this case an image carrier is needed to moveably contact against the flat face of the lenticular panel. One type of image carrier is a flat plastic sheet or panel on which an interlaced image is directly printed, or on which an image sheet is adhered. An image sheet is a thin plastic or paper film or sheet, on which an interlaced image has been printed. A typical thickness of an image sheet is less than 0.5 mm (about 20 mil). An image carrier is generally thicker and more rigid than an image sheet. The thickness of image carriers is typically between 0.5 mm to 3 mm depending on the use. A substantially rigid image carrier is more controllable than a thin image sheet. Another type of the image carrier has a substantially rigid frame on which a thin image sheet is attached. There is optionally a tension means on the frame for stretching the image sheet to keep it planar.

The quality of a displayed image depends on the pitch of the lenses (measured in LPI—Lenses Per Inch), and on the alignment and contact between the lenticular panel and the image carrier. The pitch of the lenses defines the highest resolution of the display, with higher LPIs providing finer image quality.

An interlaced image for such a lenticular panel consists of a series of alternating strips from two or more different images that are interlaced together. The distance between the two adjacent strips is equal to the distance between the two adjacent lenses in the lenticular panel. To view a complete image and have a smooth transition between the displayed images, the angular alignment of the linear axis of the lenses with the linear axis of the image strips must be maintained. This is difficult to achieve in dynamic displays that are subject to relative movement between the lenticular panel and the image carrier, particularly in installations where there is shrinking and expansion of the lenticular panel and image carrier material due to temperature and humidity change, etc.

In another aspect, uneven contact of the lenticular panel and the image carrier causes at least a part of the images to fall outside of the focal length of the lenses, which produces "ghosting" (i.e. seeing two or more images at the same time), blurred display, and uneven transitions between images. For large format lenticular panels (with a size equal to or larger than about size A1, i.e. 594 mm×841 mm), the planar surface cannot be always maintained due to the process, stock and transportation of the panels, etc., making even and close contact of the lenticular panel and the image carrier hard to achieve.

Several types of dynamic lenticular image displays for showing two or more changing images are described in the prior art, including: U.S. Pat. Nos. 7,210,257; 7,234,257; 7,263,791; 6,226,906; 6,219,948; 6,748,684; 6,384,980; 6,624,947; U.S. Publication Nos. 2006/0082877; 2003/0223120; European Patent No. EP1704444; and International Patent Application No. WO 2005/124725.

In known dynamic lenticular image displays different means have been tried to maintain close contact between the lenticular panel and the image carrier, such as an inflatable sealed bladder and pump, a flexible envelope and fan, an evacuated chamber and vacuum, an electrostatic attraction system, and others. The known means for maintaining close contact between the lenticular panel and the image carrier are all associated with certain disadvantages. They are either expensive to manufacture and/or maintain, or they require opaque material, which does not lend itself to use in backlit displays, or they require structures that make it difficult to replace the image carrier, or they are simply not reliable.

The alignment mechanisms are also important since in larger size device even very small deviations in angular alignment can result in large displacement between the lenses and the interlaced image strips.

Another problem in the above-mentioned prior art displays is the drive means that is used for producing the relative movement between the lenticular panel and the image carrier. In order to produce a relative movement, usually either the lenticular panel or the image carrier is moved while the other remains stationary. The typical lenticular panel used for large format display has a plastic lens sheet with a thickness more than 2 mm. Accurate alignment and good contact require that both the lenticular panel and the image carrier be relatively rigid since very flexible or very thin material is difficult to control. One type of image carrier generally has a thickness of more than 0.5 mm if the plastic material is used, preferably 1 mm to 2.5 mm. Another type of image carrier uses a substantially rigid frame made from metal, wood or plastic material to carrier a thin image sheet.

Therefore, whether it is the lenticular panel that is moved or it is the image carrier, there may be hundreds of grams or more of driving load (for a large format display) on the motor and/or the reduction gear. Moreover, sometimes extra pushing or stretching means (for example) has to be used to ensure a smooth non-stop movement, which will produce extra load on the drive means.

The display apparatus generally are operated for months, or years (with regular replacement of changes of the image), requiring long service life for the driving motor and/or the reduction gears. Driving a load of more than hundreds of grams uninterruptedly for more than thousands of hours requires a larger high-quality motor and/or reduction gears, which are costly and difficult to fit in the compact space of such display apparatus.

The object of the present invention is to address one or more of the disadvantages associated with known lenticular image displays.

SUMMARY

In accordance with the present invention, a lenticular image display is provided for showing two or more changing images and/or three-dimensional (3D) motion effects, including a lenticular panel having an array of linear lenses, at least one image carrier bearing interlaced images disposed behind the lenticular panel in close contact with it, means for angularly aligning the lenses. of the lenticular panel and the interlaced images of the image carrier, drive means for producing movement of the image carrier relative to the lenticular panel, a support disposed behind the image carrier, and partially compressed rings or other arcuate elastic elements disposed between the image carrier and the support, urging the image carrier in close contact with the lenticular panel, the arcuate elastic elements also being able to roll against the image carrier so as to facilitate the movement of the image carrier.

In certain embodiments the lenticular image display has means to reduce the load on the driving means, which includes at least one extension spring or torsion spring to counterbalance the force that is exerted on the driving means.

In certain embodiments the lenticular image display has means for angularly aligning the lenticular panel and the image carrier including at least two alignment mechanisms that bear against an edge of the image carrier wherein at least one of the alignment mechanisms is adjustable, and means for maintaining the image carrier in contact with both of the two alignment mechanisms.

Embodiments of the invention are described in further detail below, and shown in the accompanying drawings. Those skilled in the art will appreciate that many variations of the described embodiments are possible within the broad scope of the invention as claimed.

DETAILED DESCRIPTION

Figure 1A:
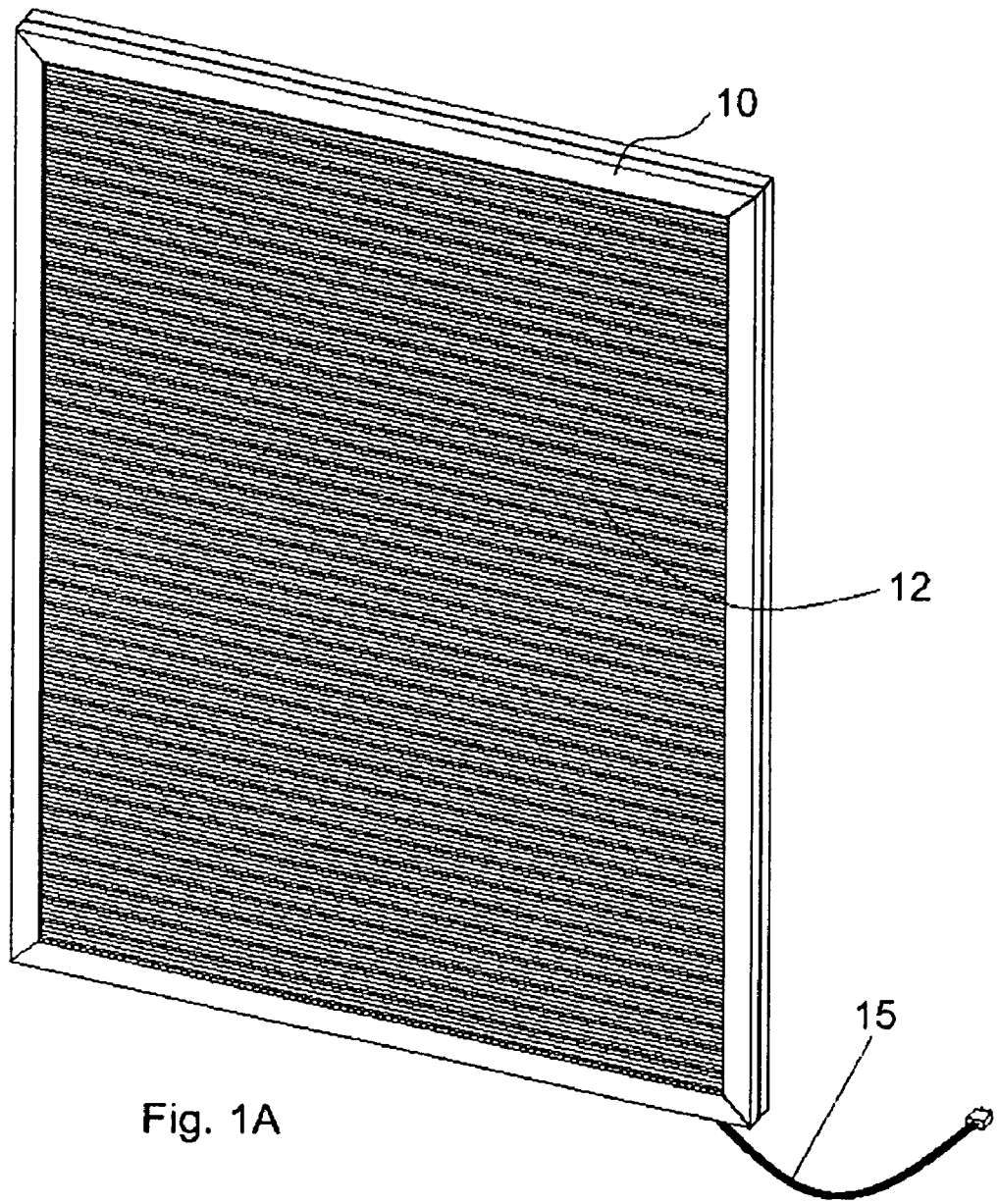
FIG. 1A is a front perspective view of a lenticular image display according to one embodiment of the invention with the lenses extended horizontally.
Figure 2:
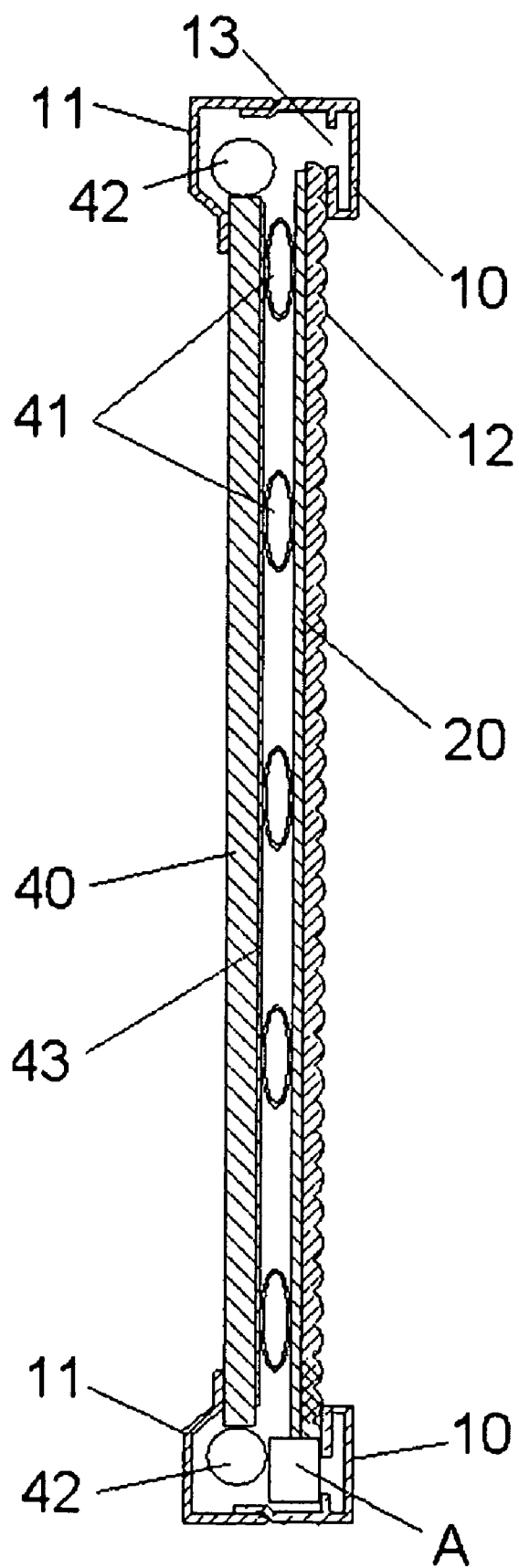
FIG. 2 is a cross-sectional view of the display of FIGS. 1A and 1B.

Referring first to FIGS. 1A and 2, a lenticular panel 12 with a horizontally extended lenses is attached on a front frame 10, which is made of extruded aluminum with an installation slot 13 facing to the back of the apparatus for attaching the front frame 10, lenticular panel 12 and other components. Power cord 15 provides electrical power to the component of the display. Image carrier 20, on which an interlaced image is directly printed or to which an image sheet is adhered, is disposed behind the lenticular panel 12 (from the view point of an observer of the display.) In certain cases, such as outdoor applications, where a large range of temperature changes may occur, the interlaced image is preferably printed directly on the image carrier 20 and the material of the image carrier 20 is preferably the same material as the lenticular panel 12 in order to have the same coefficient of linear thermal expansion.

Figure 3A:
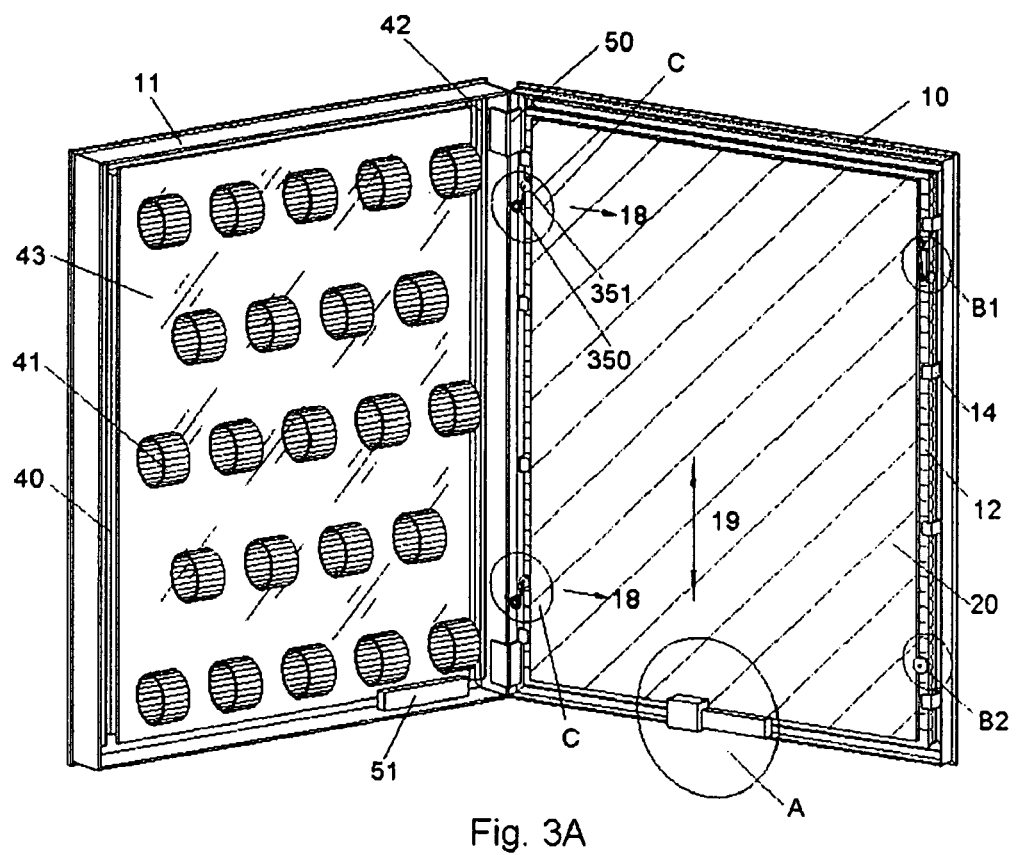
FIG. 3A is a perspective view showing an open status of the display of FIG. 1A.

Elastic ring array 41 is disposed between the image carrier 20 and a substantially rigid back plate 40, which is fixed on a back frame 11. The Elastic ring array 41 is in a compressed state so as to exert pressure on the image carrier 20 to maintain the image carrier 20 in close contact with the lenticular panel 12. Elastic ring array 41 can be directly attached on the back plate 40, or can be first attached on sheet 43 then attached on back plate 40. Back frame 11 and front frame 10 remain in close relationship when the apparatus is in normal use so that the elastic ring array 41 is compressed and able to exert pressure on image carrier 20. They are opened when changing the images or other parts located in the apparatus as shown in FIG. 3A. The front frame 10 and back frame 11 are connected by hinge 50. Electrical device 51 supplies power to the light source 42 and/or the drive means (section A). The front frame 10, back frame 11, lenticular panel 12 and back plate 40 form a housing when closed. A transparent or at least partially transparent sheet can be arranged in front of the lenticular 12 panel to protect it from dust or scratches, or to support a thinner lenticular panel when higher LPI panel is desired.

In FIG. 3A, there is also shown a group of clasps 14 that hold the lenticular panel 12 against the front frame 10 to keep the lenticular panel 12 in place. For large format displays, the lenticular panel 12 is preferably not to be fixedly mounted on the frame, since it can be deformed without any free space to expand or shrink caused by temperature and humidity change. The clasps 14 can be embedded into the lenticular panel 12 so that they do not affect the movement of the image carrier.

In this embodiment edge-lit technology is used to illuminate the images displayed by the lenticular panel 12, which enables a thinner display apparatus to be made. The back plate 40 also serves as the Light Guiding Panel to transfer the linear light emitted from linear light sources 42 to planar light. Usually a white reflective sheet is disposed behind the Light Guiding Panel to reflect the light. The linear light source can be, but is not limited to, fluorescent lamps, Light-Emitting Diode (LED) bars, Cold Cathode Fluorescent Lamp (CCFL), External Electrode Fluorescent Lamp (EEFL), etc. The linear light sources 42 can be located at one or more sides of the Light Guiding Panel 40 depending on the brightness requirement and the space arrangements for other accessories. Backlit technology can be used to replace edge-lit technology to illuminate the images being displayed. In this case a transparent or translucent sheet may be used to support the elastic ring array 41.

In FIG. 3A, drive means and load-reducing means (section A) is located at the bottom of the housing and attached on either the front frame 10 or the lenticular panel 12 for moving the image carrier perpendicularly to the orientation of the linear lenses as shown by arrow 19.

Figure 1B:
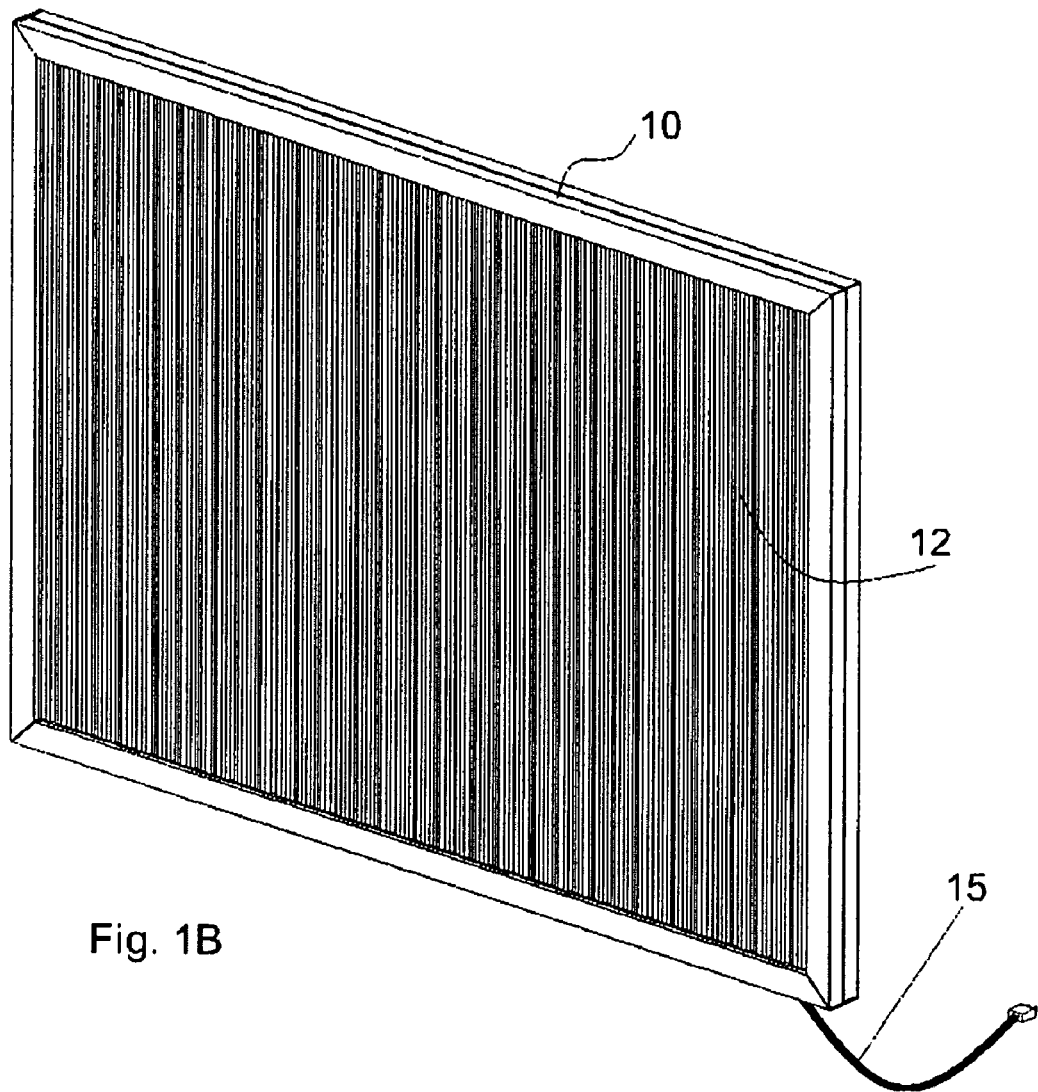
FIG. 1B is a front perspective view of the same lenticular image display with the lenses extended vertically.

FIG. 1B shows a vertically oriented linear lens that can be used for displaying 3D motion and/or animation effects. In this case, FIG. 2 can be viewed as the top cross-sectional view of FIG. 1B. The drive means and load-reducing means highlighted (section A) are located on the side of the housing.

The following paragraphs will describe various parts in detail.

(1). Alignment And Guiding Means

Figure 4:
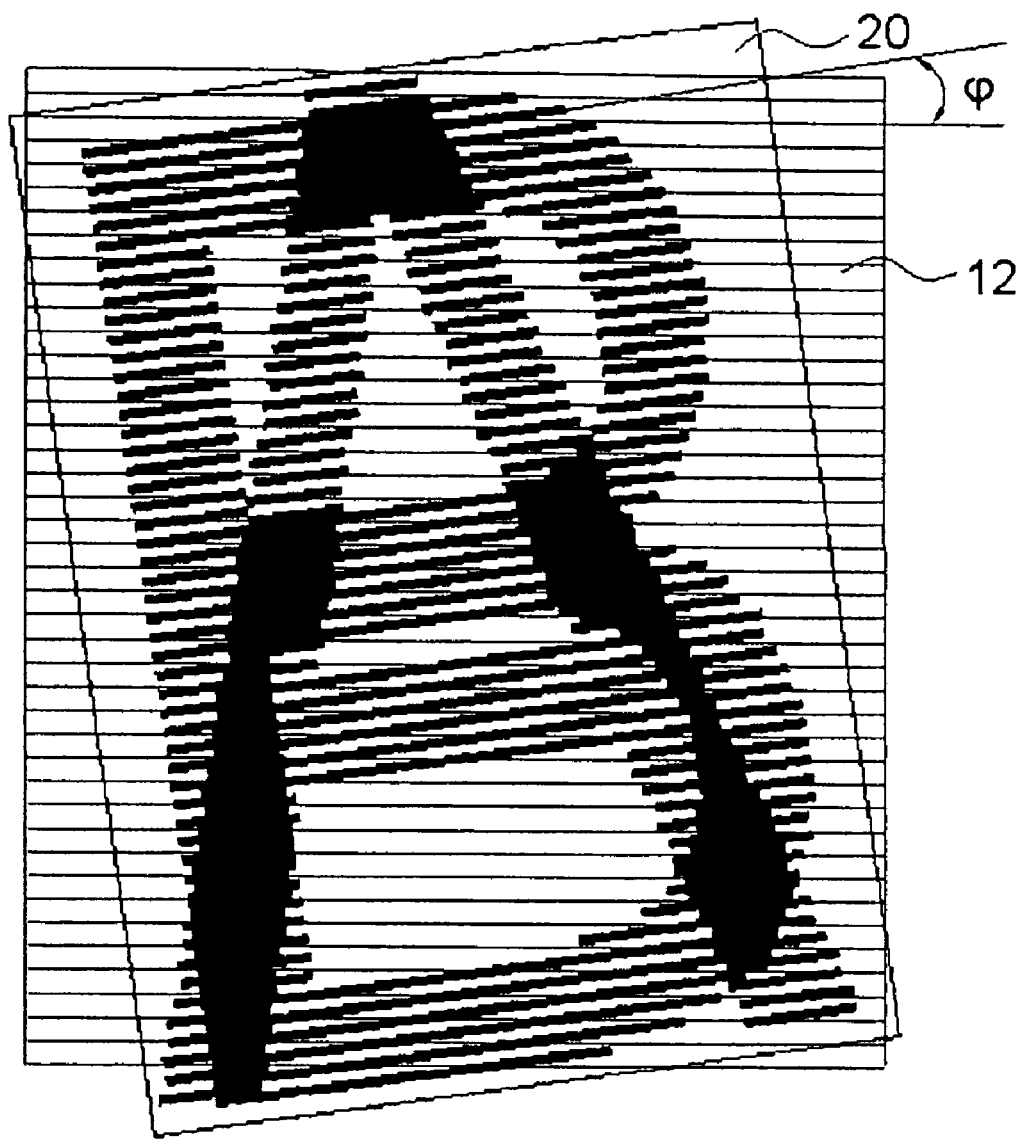
FIG. 4 is a plan view showing the angle between the linear axes of the lenses of the lenticular panel and the linear axe of the interlaced image strips of an image carrier of the display of FIG. 1A.

Referring to FIG. 4, it is seen that perfect alignment needs the angle φ between the linear axes of the lenses of the lenticular panel 12 and the linear axes of the interlaced image strips of image carrier 20, to be kept at 0° even when the image carrier 20 is moving.

Turning to FIG. 3A, alignment and guiding means comprises two alignment mechanisms (shown in highlighted sections B1 and B2) bearing against one edge of the image carrier 20, and two pushing mechanisms (shown in sections C) bearing against the other side of the image carrier 20. The two alignment mechanisms can both be non-adjustable, but preferably at least one of them is adjustable. If both of the alignment mechanisms are non-adjustable, the image carrier has to be well measured and cut to obtain good alignment. This process is usually worthwhile only when the display is for long-term or permanent use. For short-term or medium-term use where the displayed image has to be changed frequently, at least one of the alignment mechanisms should be adjustable.

Through one or both of the adjustable alignment mechanisms the angle φ can achieve angular alignment. The two alignment mechanisms thus define a line of movement. Once alignment is achieved, the two alignment mechanisms guide the direction that the image carrier is able to move. The pushing mechanisms include elastic means urging the image carrier 20 in the direction of arrow 18 and in contact with both of the alignment mechanisms even when the image carrier 20 is moving. As long as the relative position of the two alignment mechanisms and the lenticular panel are fixed, angular alignment can be maintained. For large format display apparatus it is preferable to fix the two alignment mechanisms on the lenticular panel 12. The alignment mechanisms can be fixed on the lenticular panel by means of gluing and/or screwing or other suitable means.

Figure 3B:
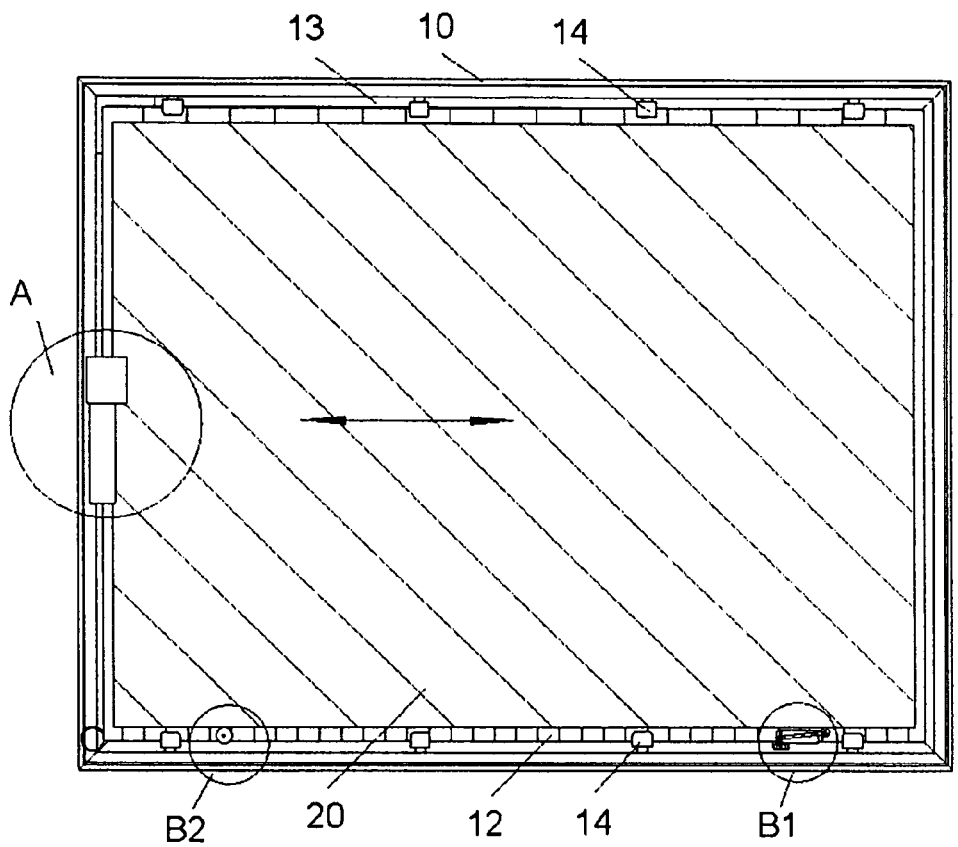
FIG. 3B is a back view of FIG. 1B showing the arrangement of alignment and guiding mechanisms and the drive means

FIG. 3B shows an embodiment where a lenticular panel with vertically extended lenses are applied. In this case, the two alignment mechanisms are located at the bottom of the lenticular panel and the image carrier 20 sits on the two alignment mechanisms (shown in sections B1 and B2). At least one of the two alignment mechanisms can be adjustable. The pushing mechanisms are not necessary because the weight of the image carrier is enough to keep it always in contact with the two alignment mechanisms to maintain the angular alignment. The two alignment mechanisms can also be located on the top of the lenticular panel but either the image carrier has to be cut a slot on the top part to let it fit in the two alignment mechanisms or an extra component has to be used to hang the image carrier on the two alignment mechanisms.

Figure 5A:
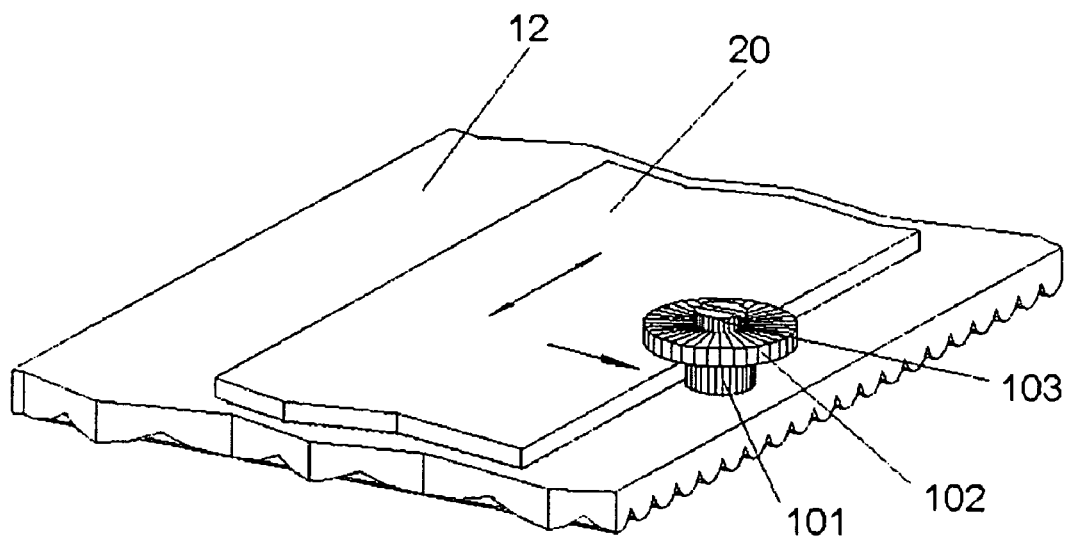
FIG. 5A is a partially perspective view showing the installation of a non-adjustable alignment mechanism.

A non-adjustable alignment mechanism mounted on the lenticular panel is shown in FIG. 5A. A roller 101 bears against the image carrier 20. The roller 101 is mounted on the lenticular panel 12 through screw 103. A washer 102 is mounted on top of the roller 101 to prevent the image carrier 20 from falling off. The roller 101 is able to rotate when the image carrier 20 is moving.

Figure 5B:
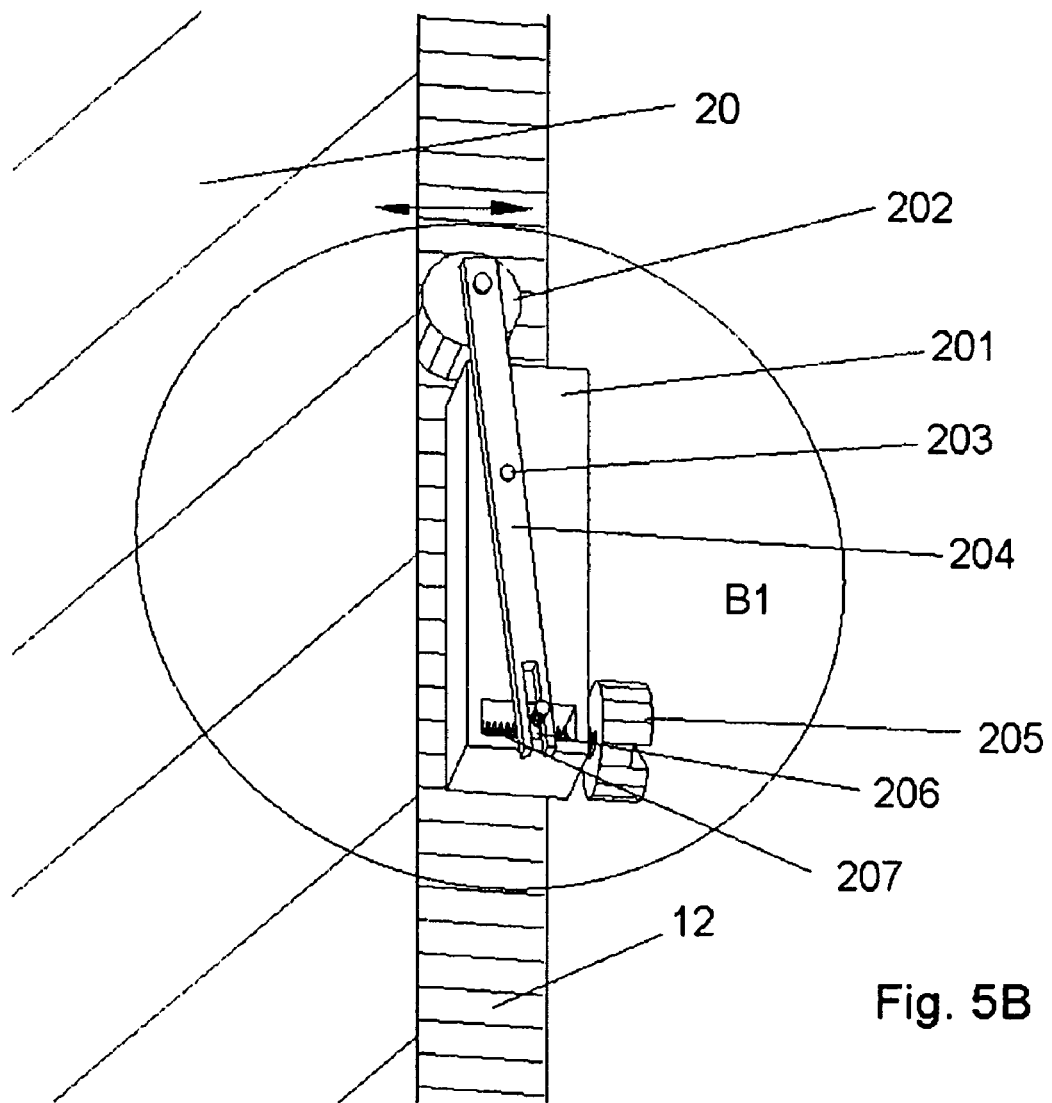
FIG. 5B is a perspective view of magnified detail of the manual adjustable alignment mechanism.

FIG. 5B shows a manually adjustable alignment mechanism. In FIG. 5B the adjustable alignment means (highlighted section B1) includes a base 201 fixed on the lenticular panel 12, a knob 205 connected with a non-advancing screw 207, a sliding block 206 driven by the non-advancing screw 207, with one end of a lever 204 coupled with the sliding block 206 through a slot and the other end of the lever 204 coupled with a roller 202. The lever can turn about a fulcrum 203, which is fixed on the base 201. The roller 202 bears against the image carrier 20. By turning the knob 205, the sliding block 206 moves along the axis of the non-advancing screw 207, making the lever 204 turn about the fulcrum 203, causing the roller to move and thereby adjust the angle between the moving line (defined by two alignment mechanisms) and the axis of the lenticular lenses. A ball bearing or roller bearing with a flange or a larger size washer can be used on the roller 202 to prevent the image carrier 20 from falling off. The knob 205 can be also turned by a screwdriver from outside of the apparatus.

Figure 5C:
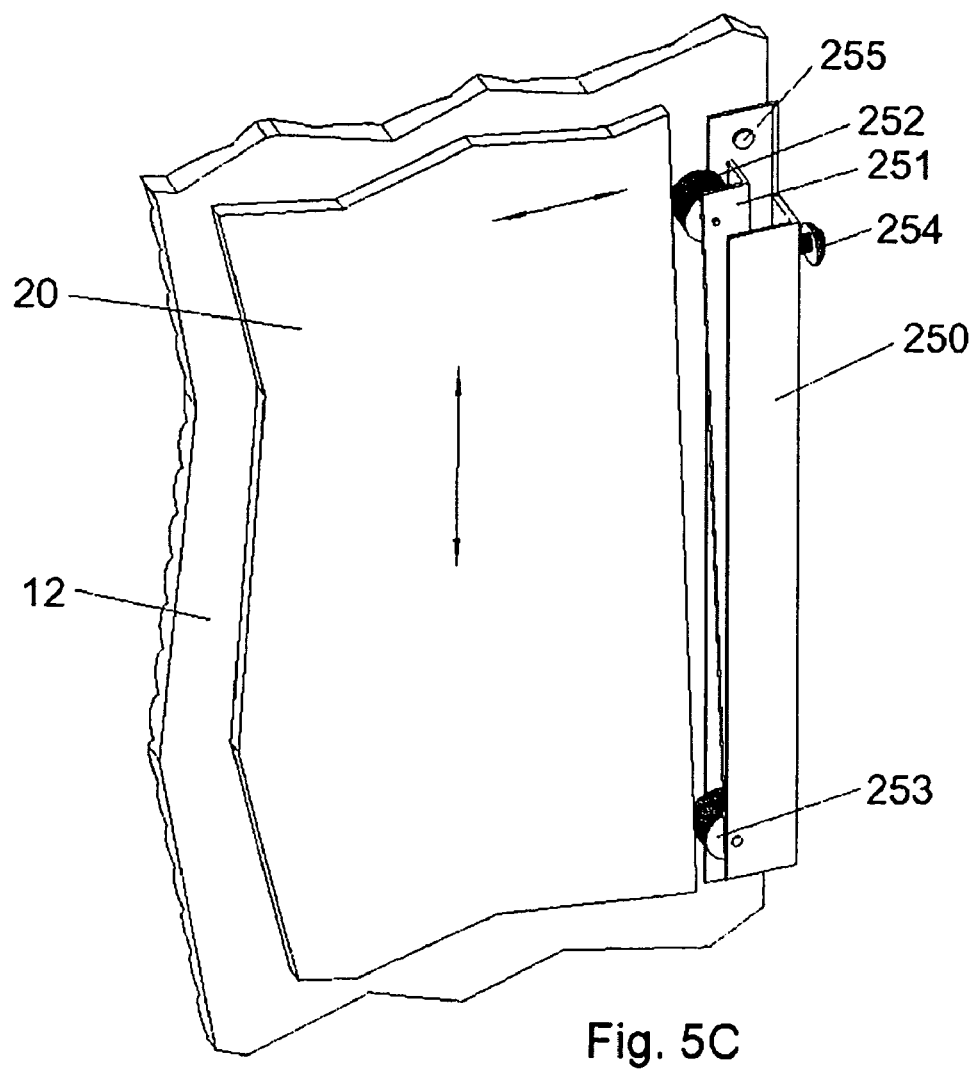
FIG. 5C is a partially perspective view showing an installation of a combined piece of the alignment and guiding mechanism.

The non-adjustable mechanism and the adjustable mechanism can be combined in one piece for easy assembly as shown in FIG. 5C. This mechanism is suitable for smaller size displays in bulk production. In FIG. 5C, fixed bracket 250 is attached to the lenticular panel 12 through screws 255. A roller 253 and one end of an adjustable bracket 251 is fixed on the fixed bracket 250. A roller 252 is fixed on the other end of the adjustable bracket 251 whose position is adjustable through an adjusting screw 254.

Figure 5D:
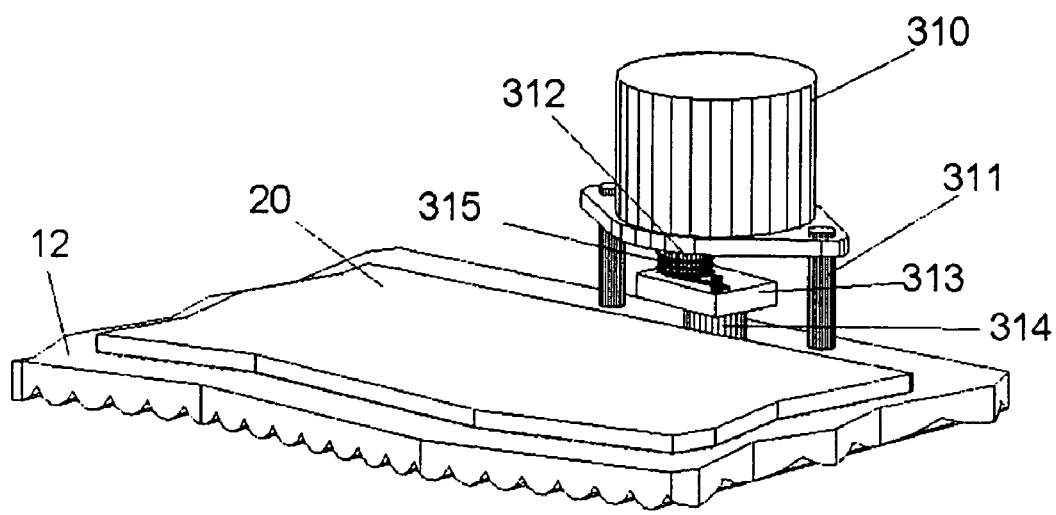
FIG. 5D is a partially perspective view showing a motorized adjustable alignment mechanism.

A motorized adjustable alignment mechanism is shown in FIG. 5D, which can be remotely controlled by wired or wireless means. This is especially useful when a displayed image has to be changed frequently, since adjusting the alignment while watching the display effect allows faster and more accurate adjusting. In FIG. 5D a geared stepper motor 310 is fixed on the lenticular panel 12 through components 311. The motor output shaft 312, connector 313 and roller 314 comprise an eccentric system. The roller 314 bears against the image carrier 20. The rotation of the motor shaft 312 will cause the roller 314 to move eccentrically, thereby adjusting the alignment between the lenticular panel and the image carrier. A torsion spring 315 is used to counterbalance the force exerted by image carrier 20 to prevent it from changing the alignment. The torsion can be adjusted to be close to the force applied on roller 314. The stepper motor can be controlled by a Microcontroller or a stepper motor control IC through wired or wireless means. Remote control of the rotation of a stepper motor is well known to those skilled in the art.

If the adjustable alignment mechanism is adjusted by the motor, the other alignment mechanism is preferably manually adjustable. The manually adjustable alignment mechanism is used in the case of motor malfunction.

Highlighted section C of FIG. 3A shows two pushing mechanisms, which are used for supplying force on the image carrier 20 to keep it in contact with the two alignment mechanisms. Section C shows an example using a torsion spring 350 and roller 351 for the pushing mechanisms. A single pushing mechanism can alternatively be used as long as it has enough force to push the image carrier 20 satisfactorily against both alignment mechanisms.

Instead of using pushing mechanisms to keep the image carrier in contact with the two alignment mechanisms, at least one stretching mechanism can be installed on the same side with the two alignment mechanisms to draw the image carrier 20 towards the two alignment mechanisms. For example, an extension spring can be used with one end attached to the image carrier; the other end is attached to the frame.

The pushing mechanisms and the stretching mechanism can use torsion springs, leaf springs, coil springs, or other elastic elements. If a stretching mechanism is used for keeping the image carrier in contact with the two alignment mechanisms, the image carrier requires eyes or other attaching means, but the advantage is that the image carrier need not be cut as precisely in size. When using pushing mechanisms, there is no extra attaching means on the image carrier but it must be cut to the required size more precisely for best use of the pushing mechanisms. Alternative means to keep the image carrier in contact with the two alignment mechanisms without using pushing mechanisms or stretching mechanisms include making a slope on the image carrier in the part where the image carrier sits on the driving roller. The weight of the image carrier will thus force itself to contact against the two alignment mechanisms.

The rollers mentioned in above mechanisms can have ball bearings or roller bearings to reduce friction and prolong the service life of the mechanisms and the image carrier.

(2) Drive Means And Load Reducing Means

Highlighted section A of FIG. 3A shows the drive and load reducing means which is located at the bottom of the apparatus. In certain applications, the drive and load reducing means can be located at the top of the apparatus. When the lenticular lenses run vertically, they can be located on the side of the apparatus. The load reducing means can use one or more extension springs, torsion springs, levers and counterweights, or a combination of them, to counterbalance the force exerted on the drive means.

In FIG. 3A, the weight of the image carrier 20 and the friction between the lenticular panel 12 and image carrier 20 are the primary load for the drive means. The friction between the lenticular panel 12 and the image carrier 20 can be reduced through carefully adjusting the pressure exerted by the elastic ring array 41 and applying anti-friction material between the lenticular panel and image carrier. The load caused by the weight can be reduced by the load reducing means.

Figure 6A:
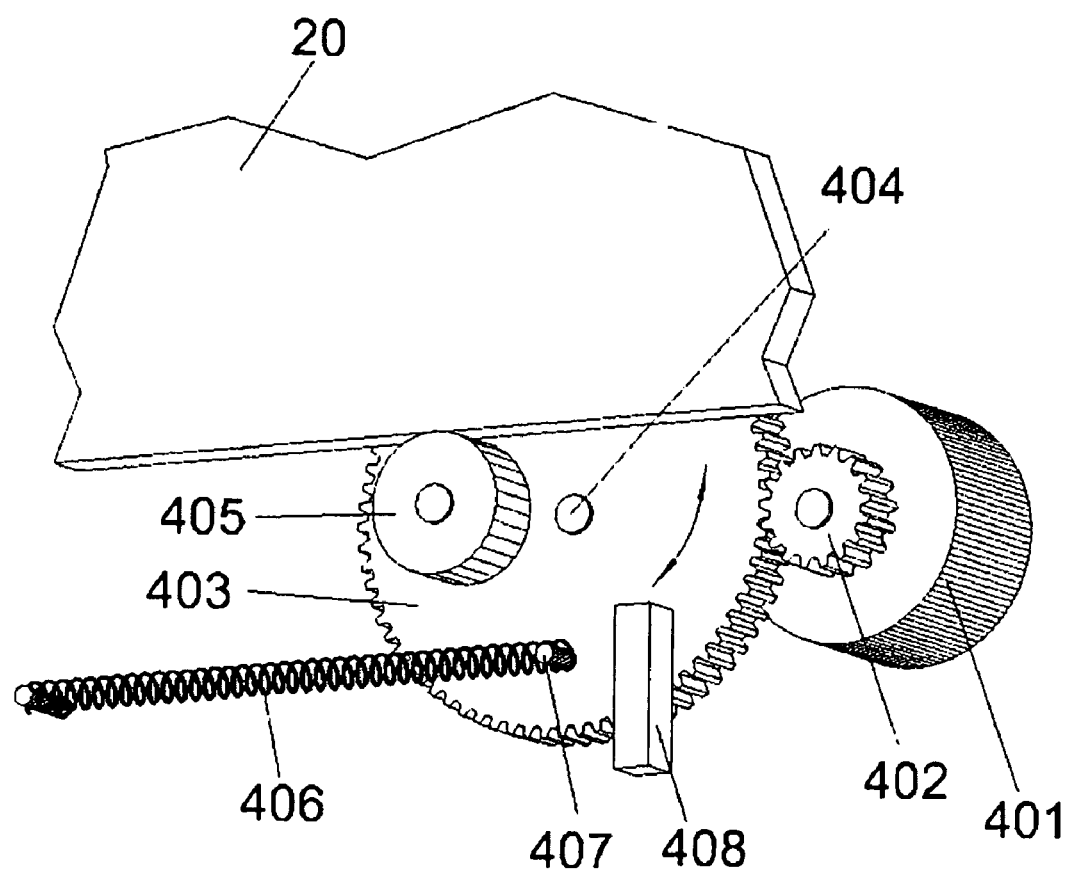
FIG. 6A is a partially perspective view showing a bottom located drive means and load reducing means using a wheel.

FIG. 6A shows one embodiment of the drive means and load reducing means. The image carrier 20 sits on a roller 405 driven by a gear 403, which meshes with another gear 402 driven by a motor 401. In order to balance the counterclockwise force on the gear 403 that is produced by the weight of the image carrier 20, an extension spring 406 exerts a clockwise force to the gear 403 through a pin 407. A balance point can be reached by adjusting the tension of the spring 406. At the balance point the weight load on the motor 401 can be largely reduced. The gear pair 402, 403 is used to further increase the load capacity of the motor 401. By using such load reducing means the power needed to move the image carrier 20 will be largely reduced. As a result, a smaller size motor, gears and power component (used to drive the motor) can be used. This not only saves costs on the motor, gears and control circuit, but also prolongs service life of the driving component and improves reliability.

The load reducing means is important especially for larger format displays where the weight of the image carrier is greater, and for battery powered displays where lower power consumption is crucial. The roller 405, the connection between shaft 404 and gear 403, and the connection between pin 407 and gear 403 can be ball bearing or roller bearing to reduce friction and prolong the service life of the mechanisms. Torsion spring can be used to replace the extension spring to counterbalance the weight of image carrier.

In this drive and load reducing system, the gear 403 rotates only through a limited angle before it changes its rotation direction. The angle that gear 403 needs to rotate depends on the distance that the image carrier 20 needs to be moved, which in turn depends on how many times a series of changing images needs to repeat in moving each direction, and also on the LPI of the lenticular panel. For example, for a 20 LPI lenticular panel, the distance between two adjacent lenses is about 1.27 mm. Moving the image carrier about 5 mm before changing direction produces a series of changing images repeating about four times. Reversing the direction of travel of the image carrier similarly producing a series of changing images that repeats about four times.

A stepper motor is preferably used for easy control of the direction, rotation speed and rotation angle, etc. Since the stepper motor itself has the capability of providing precise position control, stopper 408 in FIG. 6A is only used for initialization or in the case of motor or gear malfunction. Stopper 408 can be an electrical switch or a mechanical component. The stepper motor is controlled by a microcontroller. The process of initialization starts when the power is turned on or malfunction has been detected. Gear 403 rotates until pin 407 touches on stopper 408. This point is set as an initial point. Then the microcontroller controls the motor to reverse the rotary direction and also count the total steps that the motor needs to rotate within the required rotation angle. It thus controls the stepper motor to reverse its rotary direction each time before pin 407 touches stopper 408 by controlling the moving steps of the motor. Since the rotary direction of the motor is controlled by an electronic signal instead of using switches, reliability is improved.

The speed of the motor can be easily controlled by the microcontroller to meet different application requirements. Moreover, in certain displays it may be desirable to have one image changing speed in one direction and a different image changing speed in the reverse direction, which can be easily achieved by the microcontroller as well. An infrared or RF (Radio Frequency) remote control means can as well be used to remotely adjust the speed of the stepper motor so as to alter the speed that the images change.

A DC motor, brushless DC motor, or synchronized motor could also be used for the drive means, but DC motors have the drawback of shorter service life or need to be maintained regularly, brushless DC motors are costly, and synchronized motors are not speed adjustable (except with a change of frequency, which is costly). Moreover these types of motors do not provide as precise the position control as stepper motors.

Figure 6B:
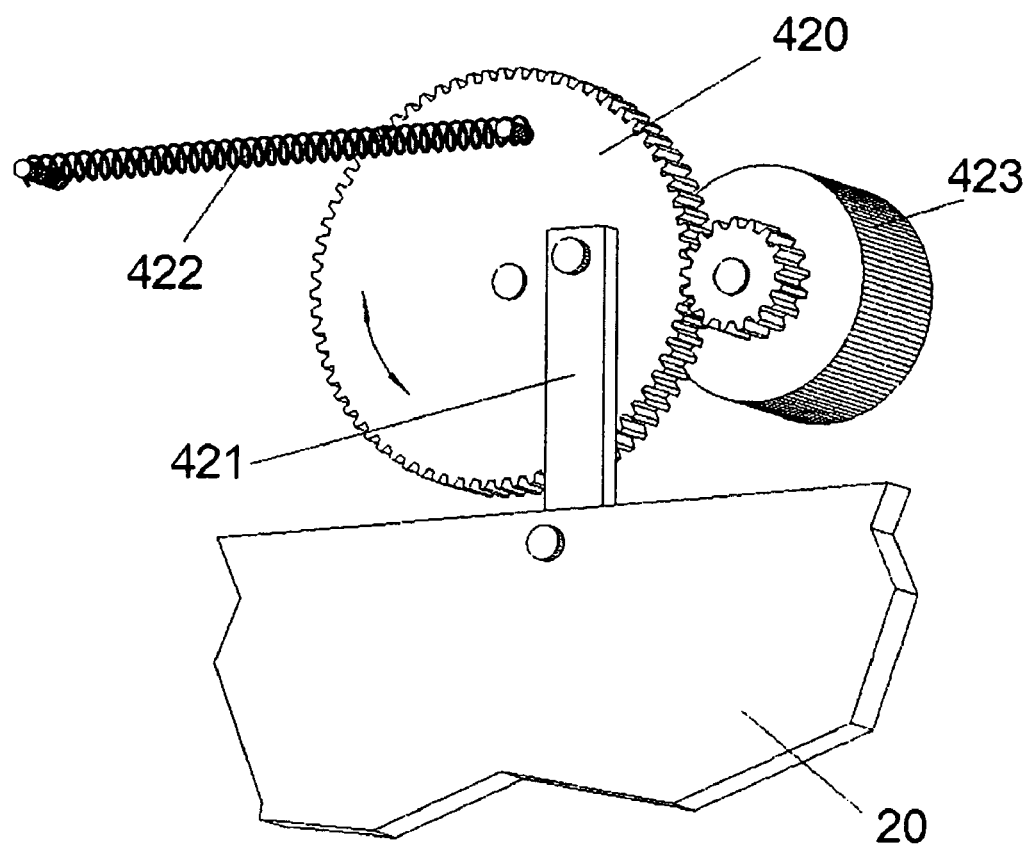
FIG. 6B is a partially perspective view showing a top located drive means and load reducing means using a wheel.

FIG. 6B shows an embodiment where the drive and load reducing means are located at the top of the apparatus. In this case, image carrier 20 is hung on a gear 420 through a connector 421. An extension spring 422 is used to counterbalance the weight of the image carrier 20 to reduce the load on the motor 423. This arrangement requires attachment means on the image carrier 20 such as eyes. However in large format displays, hanging the image carrier can keep better planarity than having it sit on a roller.

The gear pair transmission shown in FIGS. 6A and 6B can be replaced by a synchronous belt and pulley transmission system.

Figure 6C:
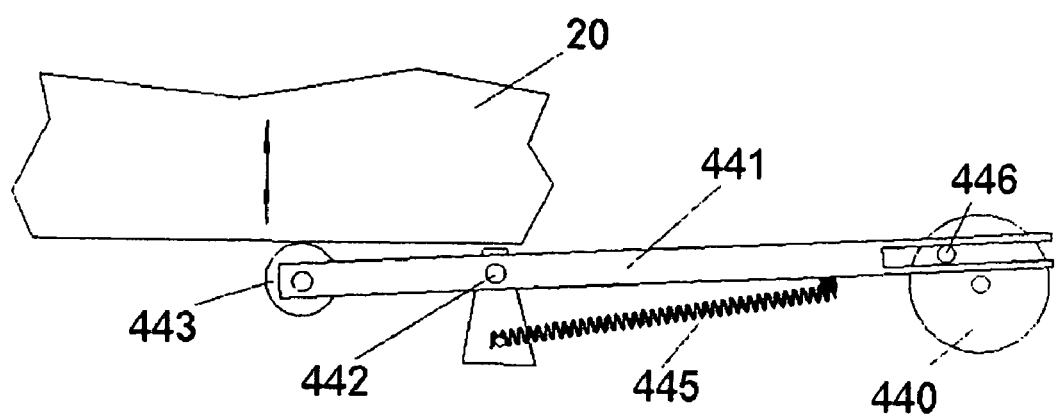
FIG. 6C is a partially perspective view showing a bottom located drive means and load reducing means using a lever.

FIG. 6C shows another bottom located drive and load reducing means using a lever and extension spring. A wheel 440 coupled with a motor drives one end of a lever 441 through a pin 446 to pivot about a fulcrum 442. A roller 443 located on the other end of the lever 441 bears the Image carrier 20. An extension spring 445 counterbalances the weight of the image carrier 20 to reduce the load on the wheel 440. This drive and load reducing means can also be arranged at the top of the apparatus similarly to that of FIG. 6B. Instead of using the roller 443, a connector can be used to hang the image carrier on the end of lever 441. Such a drive and load reducing means enables the use of a DC motor or a synchronized motor since the wheel 440 can rotate without changing direction. Such a system is simple but the changing of the images pauses at the top point and bottom point.

Figure 6D:
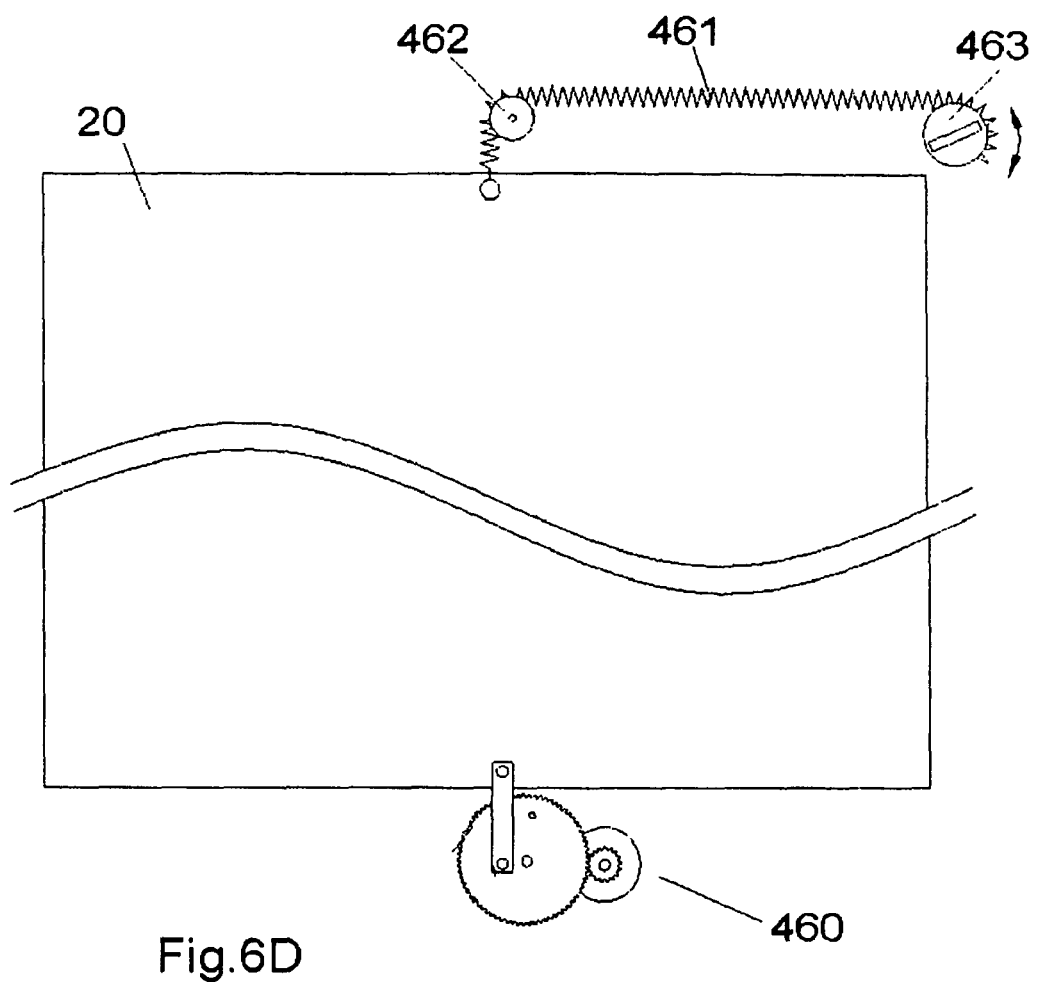
FIG. 6D shows a separately arranged load reducing means with the drive means.

The load reducing means can as well be separate from the drive means as shown in FIG. 6D. The image carrier 20 is attached on an extension spring 461. A pulley 462 and tension adjuster 463 are fixed on the frame. Through adjusting the tension of the extension spring 461, the least load can be reached at the balance point between the weight of the image carrier 20 and the tension of the extension spring 461. The drive means 460 is located at the bottom of the apparatus.

A mechanism similar to the one shown in FIG. 5D can be used as the drive and load reducing means. In FIG. 5D a geared stepper motor and a torsion spring is used for motorized angular alignment. It can also be used to drive the image carrier 20 as long as the power of the stepper motor is strong enough. If a higher power stepper motor is used, this mechanism can work without gears to simplify the whole drive and load reducing system.

Instead of using an extension spring or torsion spring to reduce the load of the image carrier, a lever and counterweight configuration can also be used. For example, the image carrier can be coupled on one end of a lever with the counterweight located on the other end of the lever to counterbalance the weight of the image carrier. The resulting load on a motor to drive the lever turning about the fulcrum will be much less. A sliding block can be arranged on the lever to adjust the balance of the lever. In some embodiments the lenticular panel can be used as the counterweight so that no extra weight will be put on the apparatus. In this case, both the lenticular panel and the image carrier move during operation.

Figure 6E:
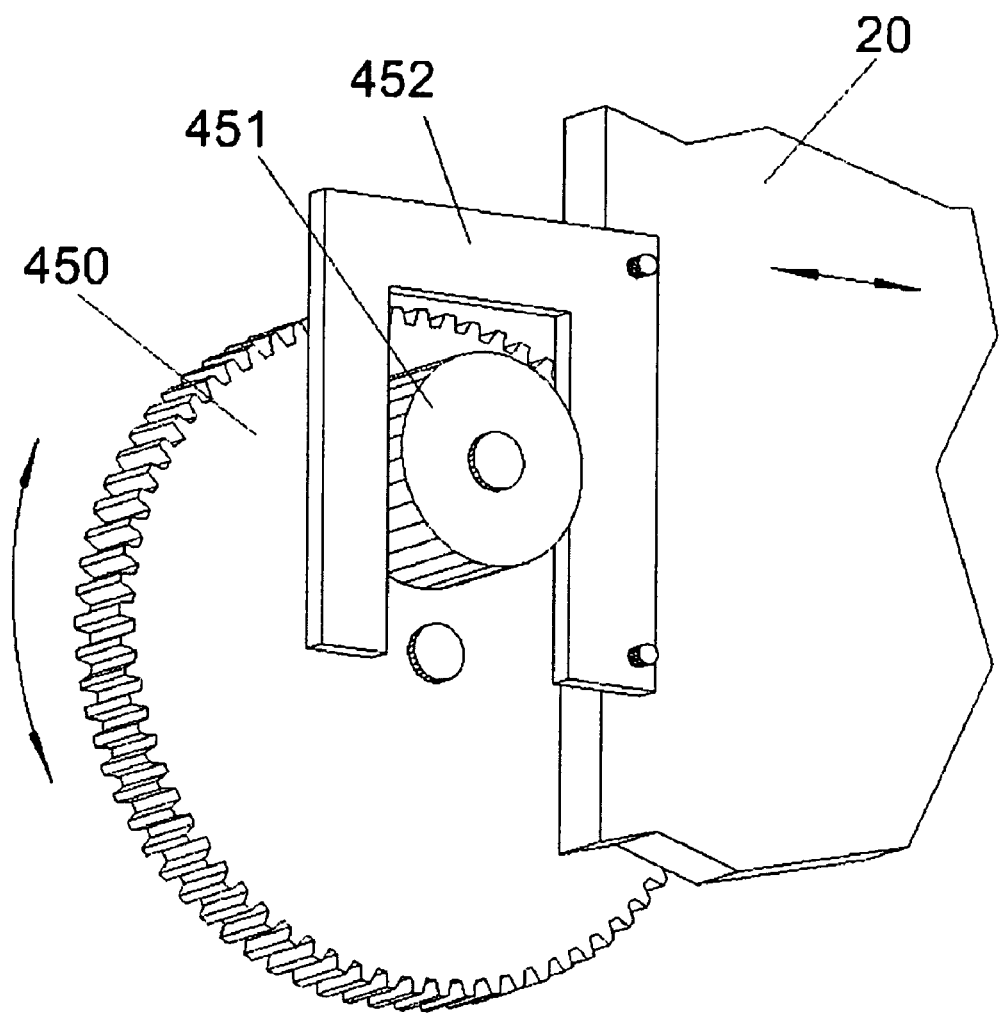
FIG. 6E is a partially perspective view showing side located drive means used in vertical extended lenses.

When the lenses of the lenticular panel run vertically as shown in FIG. 3B, drive means can be similar to that described above. In this case the image carrier sits on two alignment mechanisms so that there is no weight load for the drive means, and the load reducing means can be omitted in certain embodiments. FIG. 6E shows a drive means wherein a roller 451 is attached on a gear 450 that drives the image carrier 20 moving horizontally through a bracket 452 that is coupled with image carrier 20. Since there is a clearance existing between the bracket 452 and the roller 451, a short pause will appear when the motor reverses direction. In some embodiments a pushing mechanism or stretching mechanism similar to that used in the alignment and guiding means can be used to push or stretch the image carrier (or the bracket 452) in order to eliminate the pause phenomenon caused by the clearance between the driving roller and the bracket. The load reducing means can be used to counterbalance the pushing or stretching force. Alternative means to reduce the pause phenomenon includes controlling the motor speed and step size during directional changes to promote faster clearance.

In some cases when the lenses extends horizontally, the weight of the image carrier is not enough to overcome the friction between the image carrier and the lenticular panel, and the image carrier will have a jumpy movement. One way to solve this problem is to put extra weight on the image carrier to ensure a smooth movement. Another way is to use a drive means similar to the one shown in FIG. 6E. The use of a bracket, which is similar to the bracket 452, can move the image carrier in both directions without depending only on the weight of the image carrier for the downward motion. The pause phenomenon and possibly jumpy movement, which are caused by the clearance between the driving roller and the bracket, can be eliminated using above described pushing or stretching means and motor control means. The load reducing means can help to reduce the load caused by the extra weight or the pushing or stretching means used to eliminate the pause phenomenon.

(3) Elastic Ring Array

Figure 7A:
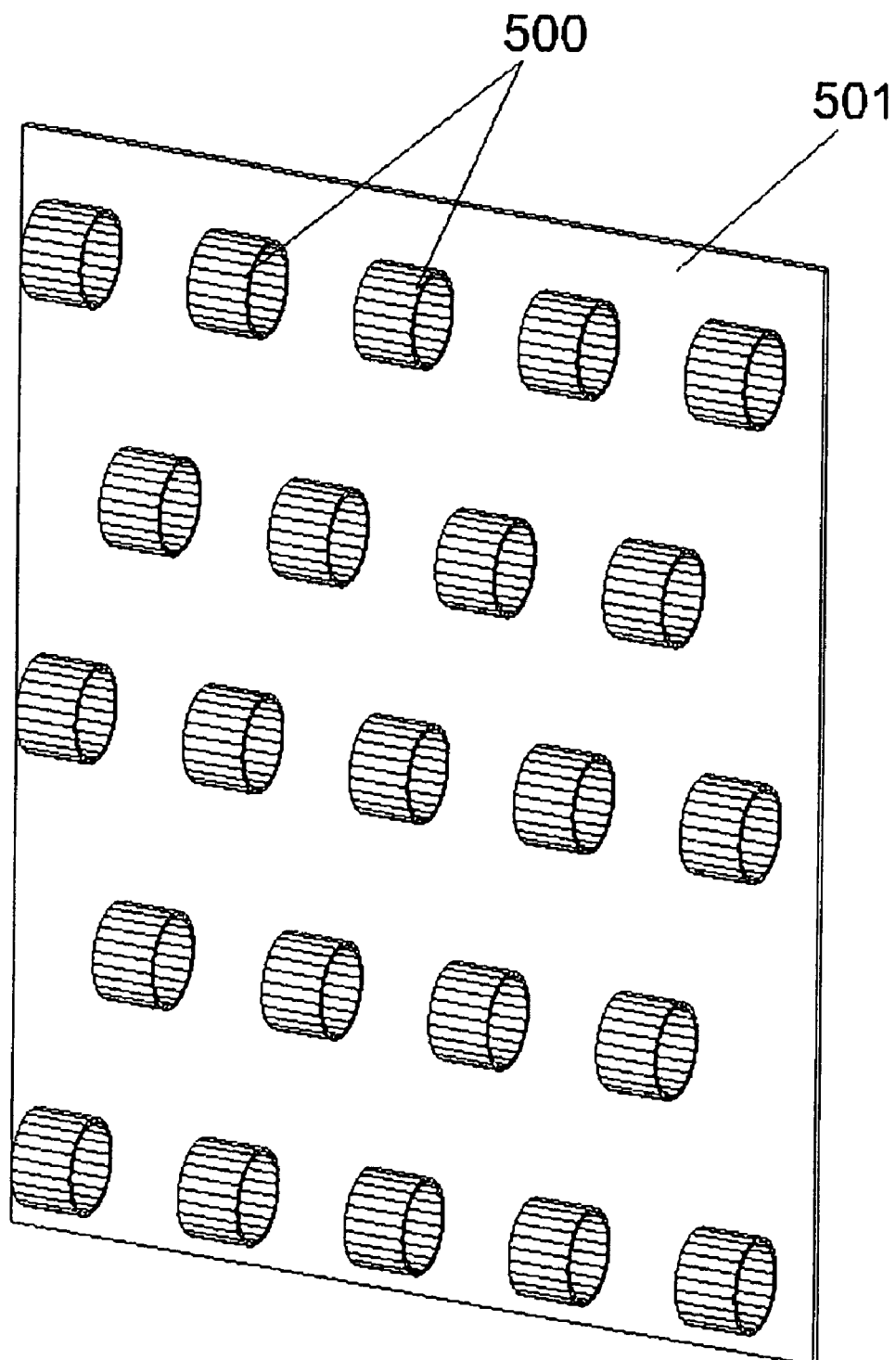
FIG. 7A shows a perspective view of the elastic ring array.

FIG. 7A shows a perspective view of an elastic ring array, which consist of a number of plastic rings 500 made from plastic sheet, plastic pipe or other elastic material being attached on at least one supporting sheet or board 501 to form an array with the property of elasticity when being pressed. The elastic ring array is pushed against the back of the image carrier that each exerts pressure independently to a part of the image carrier in contact with it to maintain the image carrier in close contact with the lenticular panel. Through choosing the thickness, width and diameter of the plastic rings, and the density of the array (the number of rings per square foot), the elastic ring array can be made to meet different requirements.

One advantage of using an elastic ring array is that there is little or no friction produced between the elastic ring array and the image carrier since the sheet for the rings to attach is relatively stationary when the image carrier is moving, the rings can roll between the image carrier and the sheet. The result is that overall friction is much reduced when the image carrier is moving. This not only reduces the load on the drive means but also lets the image carrier run smoothly. The elastic ring array and supporting sheet or board can be made from transparent plastic material if the display needs illumination from the back. Another advantage is that the elastic ring array is easy to make at low cost. The typical material to make the plastic ring is transparent polyester sheet at the thickness between 0.07 mm to 0.5 mm. Means to make a ring array from plastic sheet includes, but is not limited to, one or more processes of sheet cutting, gluing, stapling, thermal soldering and thermal molding, etc.

Figure 7B:
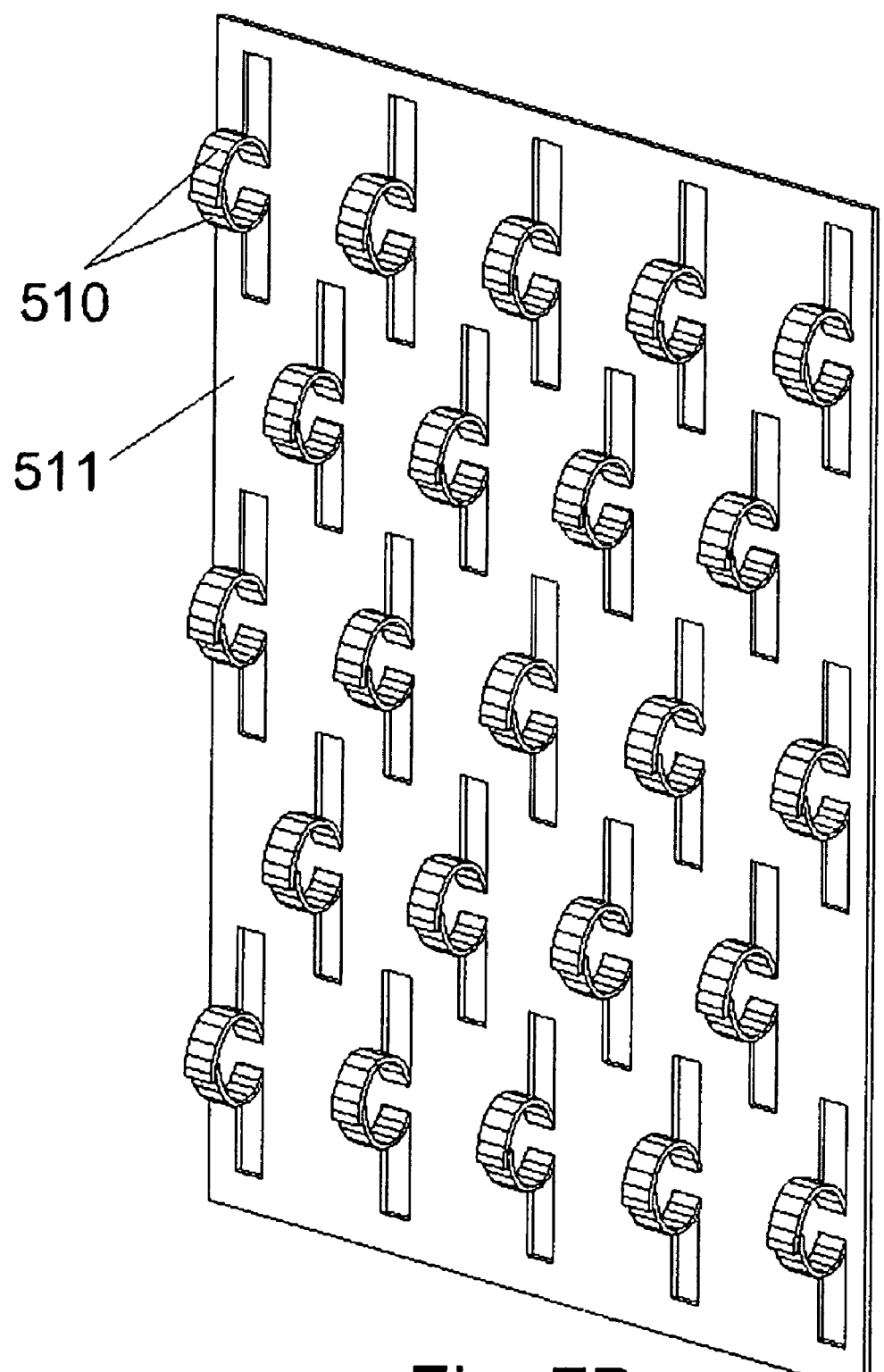
FIG. 7B shows a perspective view of an elastic ring array made by two bands cut from a sheet.
Figure 7C:
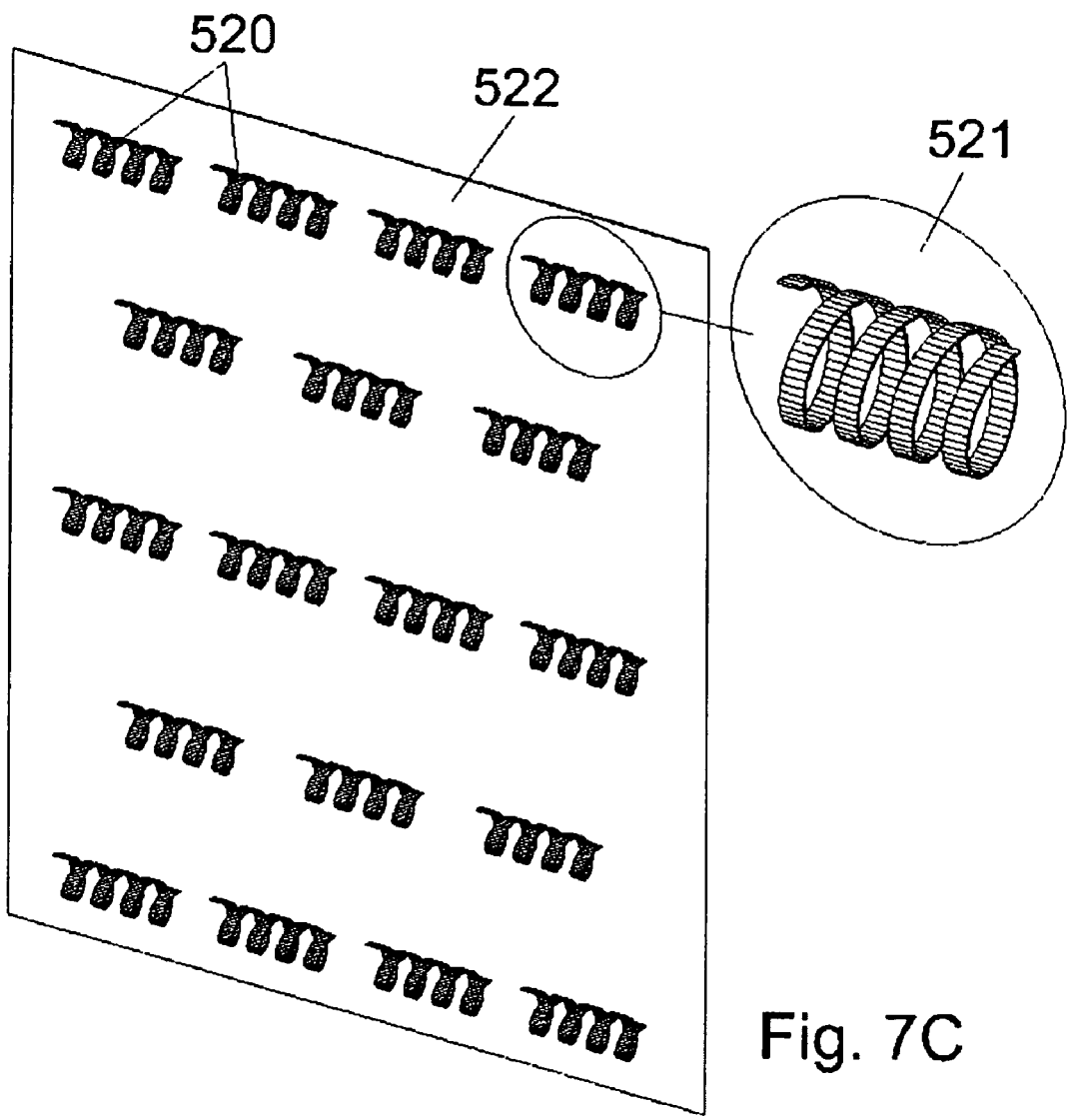
FIG. 7C shows a perspective view of an elastic ring array in helical format.
Figure 7D:
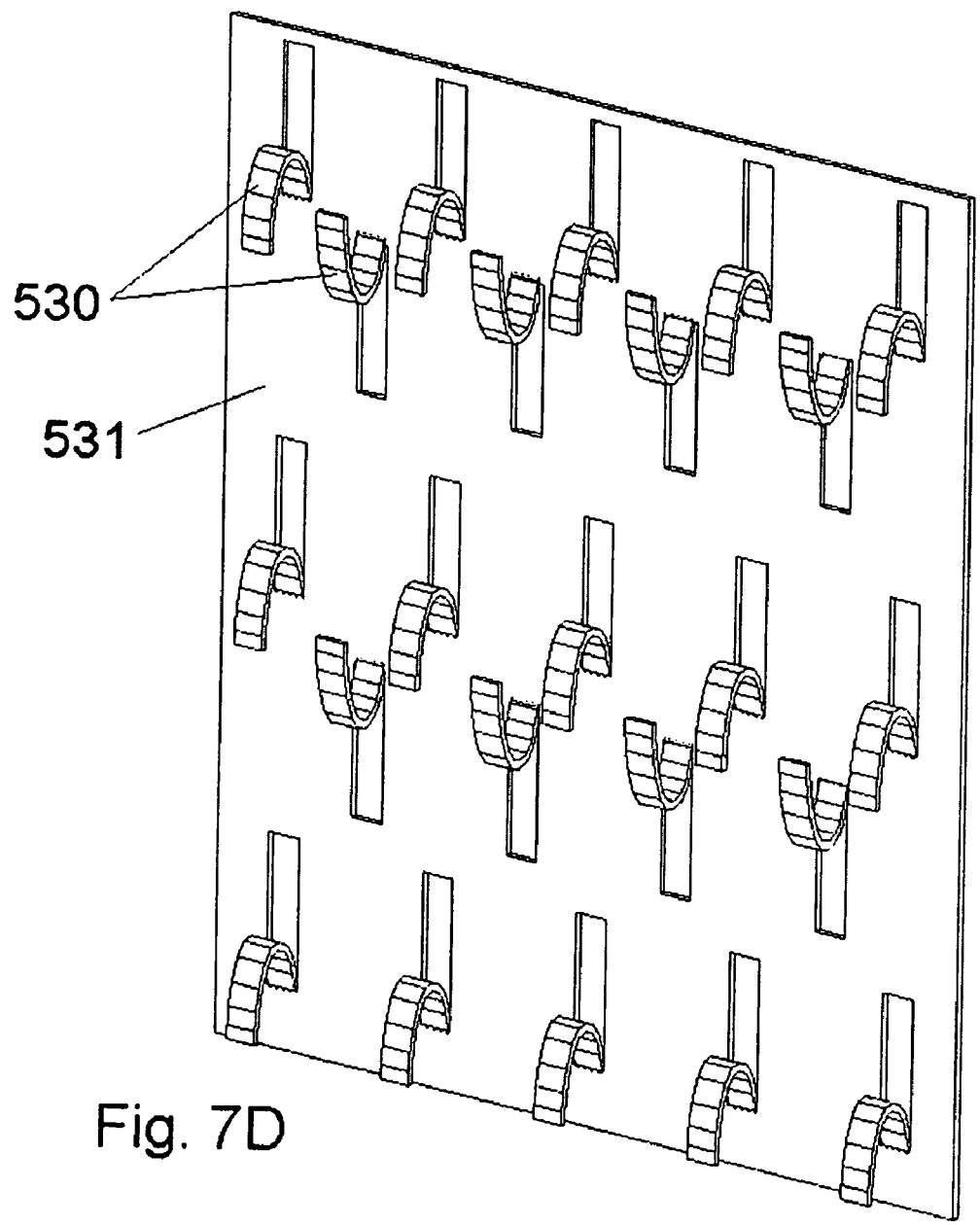
FIG. 7D shows a perspective view of an elastic ring array in half ring format.

FIG. 7B through FIG. 7D show alternative means to make the elastic ring array. They are especially suitable for machinery bulk production. FIG. 7B shows an array where the rings are defined by two separate bands whose free ends are attached. The bands 510 that form the ring can be machine cut from plastic sheet 511. FIG. 7C and FIG. 7D show a helix ring array and a half ring array respectively which can be define special types of ring arrays having the same or similar properties. The helix ring 520 can be thermally formed from plastic strips and then glued or soldered onto a plastic sheet or board 522. Section 521 is a magnified view of one helix ring. The half ring array 530 can be thermally formed from bands cut from a plastic sheet 531.

The skilled artisan is able to decide the preferred size and density of the elastic ring used for specific display by simple experiment.

Figure 7E:
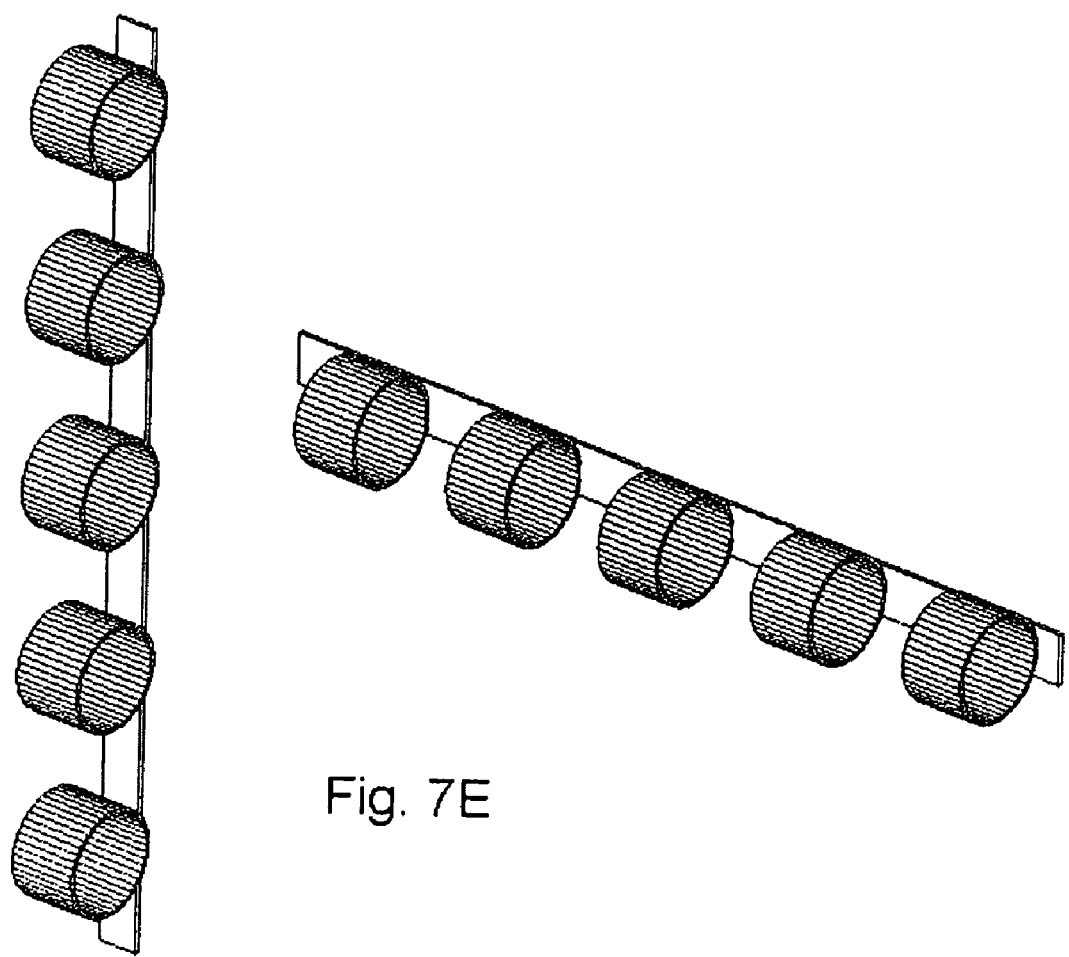
FIG. 7E shows a perspective view of a single line unit of the elastic ring array.

The rings of the elastic ring array used for a display apparatus do not necessarily all have the same parameters, i.e. a same size, or same thickness, etc. For example rings with less elasticity can be arranged at the central part and those with stronger elasticity can be arranged at the edge part. Ring arrays can be made from one or more strips shown in FIG. 7E.

If an elastic ring array is used for a lenticular panel with a vertical running lenses, the axes of the rings should preferably be vertical to let the rings "roll" between the lenticular panel and image carrier.

(4) Image Carrier

Figure 8:
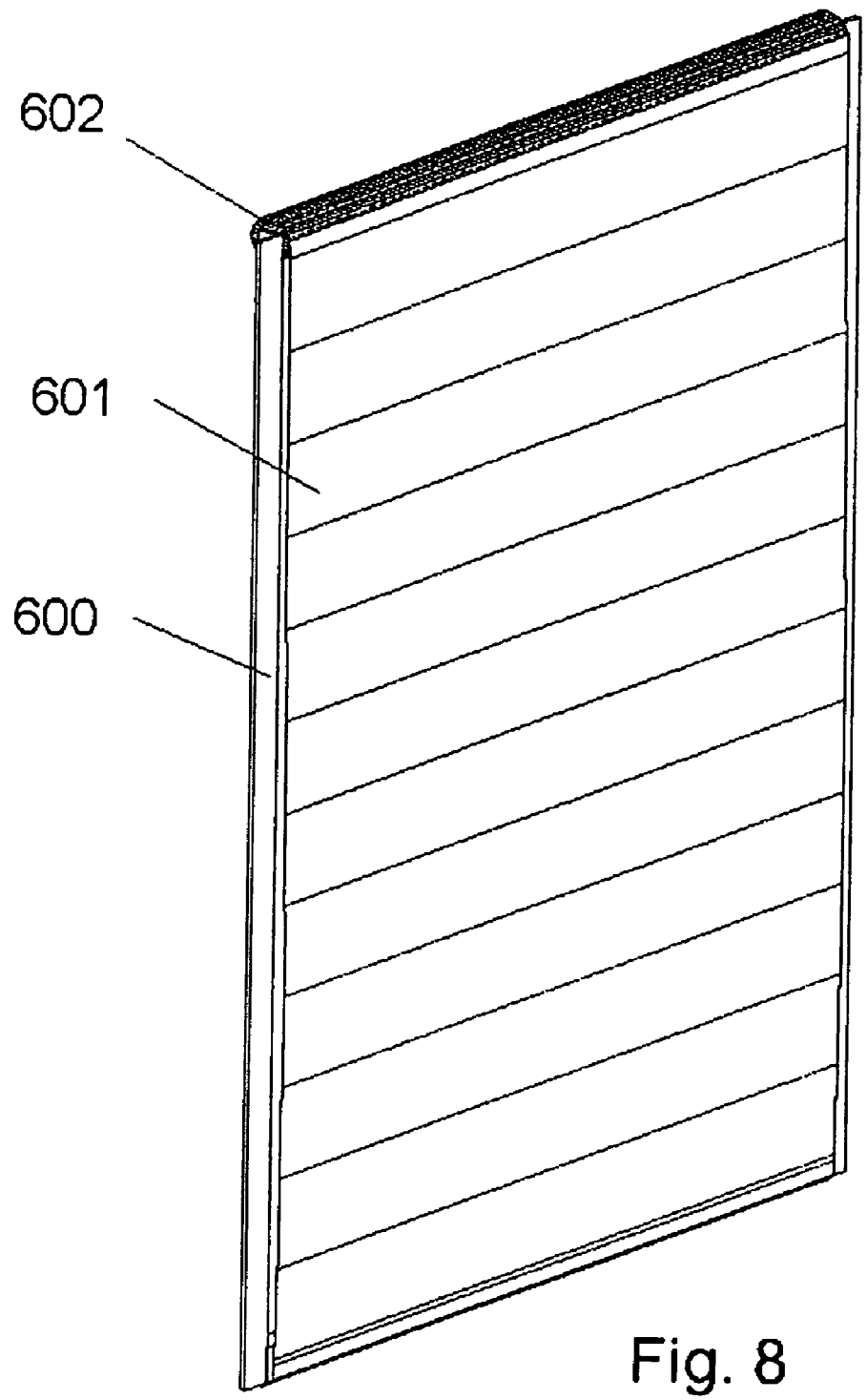
FIG. 8 shows a perspective view of an image carrier formed by a substantially rigid frame carrying an image sheet.

One type of image carrier suitable in the above embodiments uses a substantially rigid material with either an interlaced image printed directly on it, or with an image sheet attached to it. Typical material used for an image carrier of this type is transparent or translucent plastic material with a thickness more than 1 mm. This material is costly and hard to roll for easy carrying or transportation. Another type of suitable image carrier uses a substantially rigid frame to carry a thinner image sheet with a thickness less than 0.5 mm. As shown in FIG. 8, interlaced image sheet 601 is attached on a substantially rigid frame 600. Optionally, a tension means 602 is able to stretch the thin image sheet 601 to keep it planar. The tension means 602 can use an extension spring or torsion spring or other elastic element to supply tension. The frame 600 is used to support the image sheet 601 with one of its edges bearing against the two alignment mechanisms and another edge coupled with the drive means. The image sheet 601 is pushed by the elastic ring array into close contact with the flat face of the lenticular panel. Due to the flexibility of the image sheet, a higher density elastic array is preferred to ensure every part of the thin image sheet contacts the lenticular panel.

In some embodiments, when the image sheet has sufficient rigidity, such as when the image sheet is around 0.5 mm thick, the tension means 602 is not necessary. In this case, only one end of the image sheet needs to be attached to the frame, while the other end is free, facilitating expansion or shrinking and letting the elastic ring array work more efficiently.

In some embodiments, moreover, substantially rigid image carriers can be deformed due to the heat produced by the light source to an extent that cannot be overcome by the elastic ring array. A number of more rigid bars, for example made from metal or plastic, can be attached on certain parts of the image carrier to control such deformation. In addition, shielding material can be used to cover the light source in order to prevent heat from deforming the image carrier as well.

An easy alignment can be realized with the use of the frame 600 or when a substantially rigid image carrier is used. For example, a standard alignment mark can first be made on the frame, or on the substantially rigid image carrier, and then the adjustable alignment mechanism can be used to align the standard alignment mark with the lenticular panel. When attaching the image sheet on the frame or on a substantially rigid image carrier, as long as the image sheet aligns with the standard alignment mark, it will align with the lenticular panel correspondingly. The standard alignment mark can simply be one edge of the frame or the substantially rigid image carrier, or a slot or group of holes made on the frame or the substantially rigid image carrier. Printing marks or a slot or group of holes can be made on the image sheet for easy aligning with the standard alignment mark.

(5) Multiple Displays

Since the drive means may employ a stepper motor and a microcontroller system, an array of multiple displays with the same image changing speed can be achieved by synchronizing the control signals, i.e. the reverse points (where the motor reverses its rotate direction) and the moving distances of the image carriers, among the microcontrollers of the display apparatuses. For example, a 6×6 array of displays can form a large display board with an overall size of 12 feet by 18 feet if the size of each display apparatus is 2 feet by 3 feet. The images thus displayed by the display board should have the same changing speed to show a complete image.

Figure 9:
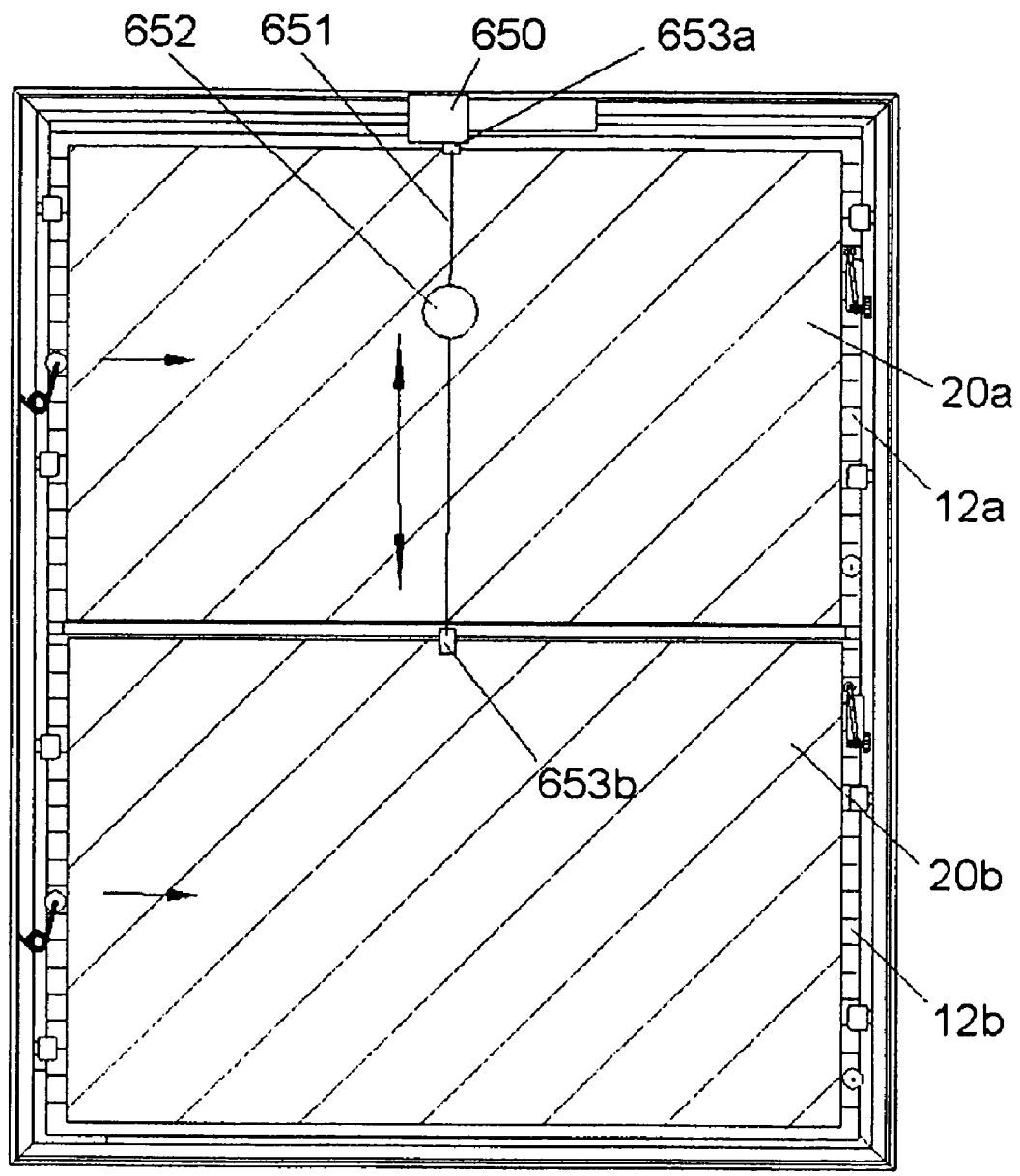
FIG. 9 shows a back view of a display formed by two sets of lenticular panels and image carriers.

With the use of the load reducing means, two or more sets of lenticular panels and image carriers can share one drive means and load reducing means to form a larger size display in one frame. This is useful where there is need for a display size larger than the standard size of the lenticular panel in the industry. Separate smaller lenticular panel and image carrier modules can also help to overcome problems caused by thermal expansion. FIG. 9 shows an embodiment that uses two lenticular panels with horizontally extended lenses 12a and 12b and two image carriers 20a and 20b. The drive means and load reducing means 650 are located at the top. A first image carrier 20a hangs on the drive means through a connector 653a. A second image carrier 20b hangs on the drive means through a thread 651 and another connector 653b. An adjustor 652 can adjust the length of the thread 651 for coordinating the two images to form a complete image. The two sets of alignment mechanisms can be separately adjusted to align each image carrier with its corresponding lenticular panel. A similar arrangement can be used with vertically extended lenses. In this case the two image carriers sit on two separate sets of alignment mechanisms. The drive means and load reducing means are located on one side coupling with one image carrier and a stretching mechanism comprising an extension spring is located on the other side to draw the other image carrier so that the two image carriers are able to move horizontally by the drive means. The elastic ring array and the backlit arrangement can be as described above.

(6) Other Embodiments

Figure 10:
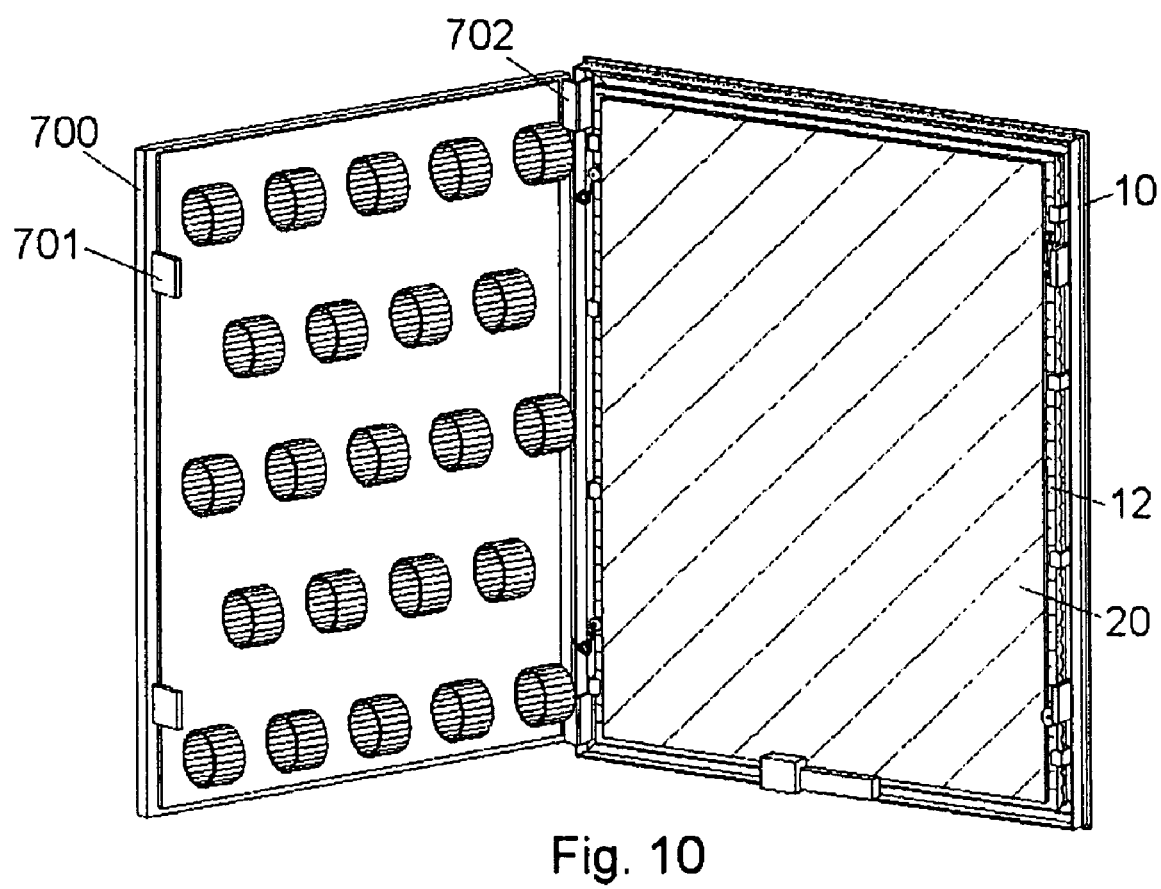
FIG. 10 shows a perspective view of a display that can be used in an existing light box.

The above embodiments can be easily modified to provide an image display that can be installed in an existing light box without making major modifications on the existing light box system. FIG. 10 shows one of the modified embodiments. The difference from previous embodiments is that the light source and the back frame are omitted and the front frame is specially made to fit the existing light box. The elastic ring array is attached to a substantially rigid transparent back plate 700, which is further attached to front frame 10 through connector 701 and 702. In some embodiments when using a thick lenticular panel, such as a 10 LPI acrylic lenticular panel with 3.8 mm thickness, a frameless image display can be made to fit into the existing light box. In this case the drive and load reducing means, the, alignment means with the pushing or stretching mechanisms, and the connectors for the back plate to be attached can be fixedly attached to the lenticular panel. The elastic ring array and the back plate can also be fixedly or removably attached to the existing light box.

Since friction between the image carrier and the lenticular panel can damage the image pigment and the lenticular panel, a protective layer can be arranged between the image carrier and the lenticular panel to prevent them from being scratched or abraded. The protective layer can be a hard coating or a liquid or film lamination, on either or both of the image carrier and the lenticular panel. The protective layer has to be thin enough not to cause the image to be out of focus. The protective layer may also help to reduce friction. To further improve protection of the lenticular panel, the protective layer can also use a disposable thin transparent sheet, with or without coating or lamination on it. The thin transparent sheet can be adhered on the lenticular panel or fixed on the frame. It can be replaced with a new one after being scratched. The above embodiments can also use battery and/or solar power to drive the motor, or even to illuminate the displayed images in small size display.

In order to further prolong the service life of the display apparatus and save power in battery powered applications, a sensing means and/or a timer can be used to control the operation of the stepper motor and the backlight units. A sensing means supplies a signal to turn on the stepper motor when a viewer is detected within range to view the display and the motor subsequently stops after a certain time. A timer controls the display time during the day. For example, it can automatically turn on the motor and illumination at 9:00 am in the morning and turn it off at 9:00 pm in the evening.

The signal from the sensing means can also be used to control the image changing speed so that the display is interactive with the viewer.

Two sets of lenticular display apparatus can also share the same light source to form a double-sided lenticular display system. If the display does not need illumination, the double-sided lenticular display can share one elastic ring array and/or one drive means and load reducing means, as well as would be apparent to those skilled in the art.

Methods that are well known in the art can be used to adapt the apparatus for an outdoor environment. The embodiments described above can also be adapted to lens barrier display devices which have an array of alternatively arranged transparent and opaque portions to display the interlaced images.

While the above description provides examples of embodiments of the present invention, it will be appreciated by those skilled in the art that features and/or functions of the described elements can be modified without departing from the spirit and principles of operation of the described embodiments. What has been described is intended to be illustrative of the invention and not limiting. It is therefore to be understood that the detailed description is given by way of illustration only and that the scope of the invention is to be limited solely by the claims.

The invention claimed is:

1. A lenticular image display comprising:
   a lenticular panel having an array of lenses;
   an image carrier bearing interlaced images disposed behind said lenticular panel in close contact therewith;
   means for angularly aligning said lenses of said lenticular panel and said interlaced images of said image carrier;
   drive means for producing movement of said image carrier relative to said lenticular panel;
   a support disposed behind said image carrier; and
   an array of arcuate elastic elements disposed between said image carrier and said support in a partially compressed state, so that the elasticity of said arcuate elastic elements urges said image carrier in close contact with said lenticular panel, said arcuate elastic elements also roll against said image carrier so as to facilitate said movement of said image carrier.

2. A lenticular image display according to claim 1, wherein said arcuate elastic elements are made from transparent plastic sheet with a thickness between 0.07 mm to 0.5 mm.

3. A lenticular image display according to claim 1, wherein said arcuate elastic elements are ring-like.

4. A lenticular image display according to claim 1, wherein said arcuate elastic elements are helical.

5. A lenticular image display according to claim 1, wherein said arcuate elastic elements are integral to at least one supporting sheet attached to said support.

6. A lenticular image display according to claim 1, wherein said image carrier is made of plastic sheet with a thickness between 0.3 mm to 3 mm, said interlaced images either being directly printed on said image carrier or being printed on an image sheet then attached on said image carrier.

7. A lenticular image display according to claim 1, wherein said image carrier comprises at least one alignment mark.

8. A lenticular image display according to claim 1, further comprising means to reduce the load on said drive means.

9. A lenticular image display according to claim 8, wherein said means to reduce the load on said drive means further comprises at least one elastic element to counterbalance the force exerted on said drive means.

10. A lenticular image display according to claim 1, wherein said drive means comprises at least one bi-directionally rotating stepper motor controlled by at least one microcontroller, the motion of said stepper motor being governed by predetermined steps in each direction.

11. A lenticular image display according to claim 1, further comprising means to guide said movement of said image carrier.

12. An image display for showing two or more changing images or three-dimensional motion effects, comprising:
    a barrier screen having an array of alternatively arranged transparent and opaque portions;
    an image carrier bearing interlaced images disposed behind said barrier screen in close contact therewith;
    a light source for illumination the images being displayed;
    means for angularly aligning said barrier screen and said interlaced images;
    drive means for producing movement of said image carrier relative to said barrier screen;
    a support disposed behind said image carrier; and
    an array of arcuate elastic elements disposed between said image carrier and said support in a partially compressed state, so that the elasticity of said arcuate elastic elements urges said image carrier in close contact with said barrier screen, said arcuate elastic elements also roll against said image carrier so as to facilitate said movement of said image carrier.

* * * * *